United States Patent
Wattenburg

(10) Patent No.: US 9,966,154 B1
(45) Date of Patent: May 8, 2018

(54) COOLING OVERHEATING REACTOR USING COMPRESSED GAS TO PROPEL LIQUID TO REACTOR

(71) Applicant: Willard Harvey Wattenburg, Chico, CA (US)

(72) Inventor: Willard Harvey Wattenburg, Chico, CA (US)

( * ) Notice: Subject to any disclaimer, the term of this patent is extended or adjusted under 35 U.S.C. 154(b) by 0 days. days.

(21) Appl. No.: 15/657,127

(22) Filed: Jul. 22, 2017

Related U.S. Application Data

(62) Division of application No. 14/243,302, filed on Apr. 2, 2014, now Pat. No. 9,852,819.

(60) Provisional application No. 61/930,369, filed on Jan. 22, 2014.

(51) Int. Cl.
  *G21C 9/00* (2006.01)
  *G21C 15/18* (2006.01)
  *G21D 1/02* (2006.01)
  *G21D 3/04* (2006.01)

(52) U.S. Cl.
  CPC ............. *G21C 15/18* (2013.01); *G21D 1/02* (2013.01); *G21D 3/04* (2013.01); *Y02E 30/40* (2013.01)

(58) Field of Classification Search
  CPC .................... G21C 15/18; G21C 15/182; G21C 2015/185; G21C 2015/187
  See application file for complete search history.

(56) References Cited

U.S. PATENT DOCUMENTS

| | | | |
|---|---|---|---|
| 4,100,745 A | 7/1978 | Gyamathy | |
| 4,765,946 A * | 8/1988 | Dagard | G21C 15/18 165/285 |
| 5,085,825 A | 2/1992 | Gluntz et al. | |
| 5,537,822 A | 7/1996 | Shnaid et al. | |
| 7,873,136 B2 | 1/2011 | Meseth | |
| 8,045,671 B2 | 10/2011 | Meseth | |
| 8,347,628 B2 | 1/2013 | Gerard | |
| 8,559,583 B1 | 10/2013 | Sato | |
| 2009/0129530 A1 * | 5/2009 | Reyes, Jr. | G21C 1/32 376/282 |

(Continued)

OTHER PUBLICATIONS

American Nuclear Society, Special Committee on Fukushima, Fukushima Accident 2011, Mar. 2012, http://fukushima.ans.org/.

(Continued)

*Primary Examiner* — Marshall P O'Connor
(74) *Attorney, Agent, or Firm* — David Pressman

(57) ABSTRACT

A passive safety system for a nuclear power plant (100) cools the plant after shutdown, even when primary water circulation is disabled. The system comprises a source of compressed gas (112, 805) which can be the system's only source of operating energy, a source of external cooling water (106, 500), and interconnection components. If the reactor overheats, the gas is used to force the cooling water into the reactor's core. The gas can be taken from a highly compressed source and decompressed to a lower pressure suitable for forcing the water from the source, in which case the water can first be used to supply heat to the expanding gas to prevent it from freezing its environment. The system can be located underground or can be portable, e.g., carried on railroad cars or other wheeled conveyances. The system can be located above ground, or in a covered trench (705).

20 Claims, 10 Drawing Sheets

(56) References Cited

U.S. PATENT DOCUMENTS

2013/0301781 A1    11/2013  Parvin et al.
2014/0069515 A1*   3/2014   Swantner ............... C02F 1/687
                                                       137/87.01

OTHER PUBLICATIONS

Hansen, James et al., Climate Change Experts Endorse Nuclear Power, World Nuclear News, Nov. 4, 2013, http://www.world-nuclear-news.org/EE-Nuclear-essential-for-climate-stability-0411137.html.
CAeS Compressed Air Energy Systems, http://en.wikipedia.org/wiki/Compressed_air_energy_storage, Huntort, Germany 290 MW CAeS 1978, McIntosh, Alabama 110MW CAeS 1991.
Westinghouse Electric Co, LLC, The AP1000 Nuclear Plant Design, http://ap1000.westinghousenuclear.com/index.html, Cranberry Township, PA, USA.
U.S. Nuclear Regulatory Commission, AP1000 Safety Evaluation Report, NUREG-1793, Sep. 2011 ( http://www.nrc.gov/reactors/new-reactors/design-cert/ap1000.html).

* cited by examiner

Fig. 8--THE NCAP POWER PLANT

COOLING OVERHEATING REACTOR USING COMPRESSED GAS TO PROPEL LIQUID TO REACTOR

CROSS-REFERENCE TO RELATED CASE

This application is a division of and claims priority of applicant's parent application Ser. No. 14/243,302, Filed 2014 Apr. 2, now U.S. Pat. No. 9,852,819, granted 2017 Dec. 26. This parent application claims priority of provisional patent application, Ser. No. 61/930,369, filed 2014 Jan. 22.

BACKGROUND

Prior-Art Emergency Cooling Systems

A nuclear power plant generates electricity by using a nuclear reactor to boil feed water to create high-pressure steam. This steam in turn drives turbines, which in turn drive electrical generators that create the electricity. The feed water is called the "primary coolant" in the nuclear industry since it absorbs and carries away the heat generated by the nuclear fuel rods in a reactor pressure vessel (RPV) inside the reactor. After the steam drives the turbines it is condensed back to water and is recirculated back to the RPV to be heated again to continuously generate new steam for the turbines.

Sometimes it is necessary to shut down a nuclear plant for operational reasons or because of an accident or terrorist attack, loss of outside electrical power, or a natural event such as an earthquake or fire. Thus some means must be provided to stop the nuclear chain reaction which is continuously occurring in the reactor. This is done by inserting control rods and-or chemical substances into the reactor to absorb the fission neutrons that drive the nuclear chain reaction and heat the primary coolant. However, stopping the nuclear reaction does not eliminate the danger or cool the reactor adequately. A major source of heat, called the "decay heat," remains. This decay heat is generated by radioactive decay of isotopes within the nuclear fuel rods. Even after shutdown this heat must be continually removed from the nuclear fuel rods for days or weeks in order to stabilize the reactor. Otherwise, a nuclear "meltdown" can occur, as happened in the Three Mile Island, Pa. (1979) and Fukushima Daiichi, Japan (2011) nuclear accidents.

During normal power generation the primary coolant circulates through plumbing (termed the "primary boundary") coupled to the RPV. The primary boundary includes an outlet pipe from the RPV (commonly called the "hot leg") that carries the steam generated from the primary coolant to the turbines. After condensation back to water the primary coolant is returned to the RPV by a pipe called the "cold leg."

Existing Emergency Core Cooling Systems (ECCS) in water-cooled reactors all depend on the continued circulation of the primary coolant around the fuel rods to absorb and dissipate the decay heat. The cooling fluid is circulated by large electrical or steam driven pumps that require backup power sources in case the nuclear plant is disconnected from the electrical grid that it serves. At least one newer and approved ECCS design, the AP1000 (see Non-Patent Literature below), called a "passive safety system," does not require backup emergency power. The AP1000 utilizes additional water from a large gravity flow storage tank mounted above the reactor to cool the primary coolant circulating through the reactor. The AP1000 relies on continuing decay heat to circulate the primary coolant through a heat exchanger by convection. Hence, the AP1000 design by itself cannot bring a reactor to "cold shutdown condition" (less than 100 degrees C.), as noted below and in the discussion of the cited patent to Sato, infra.

Naval nuclear reactors, i.e., those used in submarines and ships, are of less concern because they are surrounded at all times by abundant ocean water to cool the fuel rods in a reactor in an emergency. This degree of safety has not been available for land-based nuclear plants.

The Fukushima nuclear disaster presented a horrible reality to the world. It showed that all existing emergency reactor cooling equipment in the world's nuclear power plants today can be disabled by the forces of nature or by terrorists. The existing emergency cooling systems are fragile in many ways. The biggest weakness is that the essential emergency cooling apparatus in most nuclear plants is co-localized in the nuclear plant buildings. It is rather disturbing that after the Fukushima accident there were several nuclear plant shutdowns in the U.S. where some of the backup electrical generators failed and a last-ditch battery backup system had to be used.

Water Flow Urged by Gravity.

An example of water delivery by gravity flow is found in the above-mentioned AP1000 ECCS nuclear power plant design by Westinghouse Corp. of Cranberry Township, Pa., USA. This design employs a large tank of emergency cooling water that is placed atop a structure within a nuclear plant. When released in an emergency, gravity causes this secondary cooling water to flow through a heat exchanger where it extracts the decay heat from the hot primary coolant in the reactor. So long as the primary coolant circulation system is intact and operating, the secondary cooling water delivered by gravity is turned into steam. The steam is condensed by cooling by outside air flow over surfaces attached to the containment building. In this design, the gravity water circulation equipment is all inside the nuclear plant structure. Its large emergency water tank is mounted high above the reactor pressure vessel and thus can be disabled by severe earthquakes. Any assault on a nuclear plant that damages the internal plumbing in which the primary or gravity cooling water is circulating can disable the AP1000 ECCS. A dedicated terrorist attack that damages a few critical pipelines and valves inside the nuclear plant can disable all emergency cooling operations. This can lead to a disastrous meltdown of the fuel rods.

Water Flow Urged by Compressed Gas.

Domestic water tanks that are pressurized by compressed air above the water are well known. These tanks are designed to provide water in a given pressure range without requiring a water source to be energized for each delivery of water into or out of the tank. These tanks generally employ an impermeable membrane between the compressed air and the water below in order to avoid loss of the air by absorption of the air into the water (aeration).

Gas-pressurized water tanks called "accumulators" are used in nuclear plants today. The water is commonly loaded with a borate solution or other "neutron poisons" that stop the fission reaction in a nuclear reactor during a nuclear emergency. The tanks maintain a high-pressure nitrogen or water vapor bubble above the water. Because these accumulator tanks are placed inside the nuclear plant building and are under constant high pressure, their size is limited. They do not store sufficient cooling fluid to absorb the decay heat for many hours, let alone many days, from a nuclear reactor immediately after shutdown.

Very high static gas pressures (up to 200 bars) cannot be used in the water tanks above unless the tanks are relatively small. If the tank dimensions are large or the gas pressures too high, they cannot withstand the high hydraulic forces on the walls of the tank without bursting.

Prior-Art

The following is a list of some possibly relevant prior art that shows prior-art emergency cooling systems for nuclear power plants. Following this list I provide a discussion of these references.

| U. S. Utility Patents | | | |
|---|---|---|---|
| Pat. or Pub. Nr. | Kind Code | Issue or Pub. Date | Patentee or Applicant |
| 5,085,825 | $B_1$ | Feb. 4, 1992 | Gluntz et al. |
| 7,873,136 | $B_2$ | Jan. 18, 2011 | Meseth |
| 8,045,671 | $B_2$ | Oct. 25, 2011 | Meseth |
| 8,559,583 | $B_1$ | Oct. 15, 2013 | Sato |

Non-Patent Literature

1. AMERICAN NUCLEAR SOCIETY, Special Committee on Fukushima, Fukushima Accident 2011, March 2012, http://fukushima.ans.org/.
2. HANSEN, JAMES ET AL., Climate Change Experts Endorse Nuclear Power, World Nuclear News, Nov. 4, 2013, http://www.world-nuclear-news.org/EE-Nuclear-essential-for-climate-stability-0411137.html.
3. CAeS Compressed Air Energy Systems, http://en.wikipedia.org/wiki/Compressed air energy storage, Huntorf, Germany 290 MW CAeS 1978, McIntosh, Ala. 110 MW CAeS 1991.
4. WESTINGHOUSE ELECTRIC CO, LLC, The AP1000 Nuclear Plant Design, http://ap1000.westinghousenuclear.com/index.html, Cranberry Township, Pa., USA.
5. U.S. NUCLEAR REGULATORY COMMISSION, AP1000 Safety Evaluation Report, NUREG-1793, September, 2011 (http://www.nrc.gov/reactors/new-reactors/design-cert/ap1000.html)

Gluntz and Meseth both show "accumulator" tanks containing water and a well-known neutron absorbing or "poisoning" material to halt or slow a nuclear reaction. The primary purpose of the accumulators is to inject a neutron poison into a reactor vessel. This rapidly shuts down the fission reaction within the reactor in case the control rods do not function properly, or minimizes the fission reactions after a rapid shutdown of the reactor. The accumulator tanks are limited in size and internal pressure by their inherent bursting strength. Because of this size limitation, the amount of water stored in an accumulator tank is too small to perform any major cooling of a reactor. The operation of an accumulator tank is dependent on infrastructure and piping inside the nuclear plant and, as such, it will be disabled if critical elements of the infrastructure are disabled. In addition, these tanks cannot deliver enough cooling fluid to cool a reactor at peak decay heat production for more than a few minutes or hours.

Sato describes the operational features of the above-mentioned Westinghouse AP1000 passive ECCS system. Then he describes an improvement over the AP1000. He shows a Depressurization and Cooling System (DPCS) that is attached to the AP1000 design to cool the reactor to "cold shutdown condition." The DPCS uses compressed gas to propel water out of an auxiliary water tank. Sato also shows that the water tank for his DPCS can be outside the reactor Primary Containment Vessel (PCV) and optionally buried underground. However, this DPCS apparatus is connected to and part of the internal plumbing in a nuclear plant. Like the AP1000, Sato's DPCS system requires primary coolant to be circulated through the reactor and associated plumbing attached to the reactor to cool the heated coolant and hence the reactor.

Many of the pressurized accumulator tanks used in current nuclear plants use heating elements to generate water vapor, which is used to provide a pressurizing fluid above the stored water. This is preferable to using stored compressed gas at high pressure inside a nuclear plant because a ruptured gas tank could present a significant safety issue. However, the electrical power required for such heating elements may not be available in a disabled nuclear power station.

While each of the above systems may be suited for their particular use, all have one or more deficiencies as noted.

SUMMARY

The emergency reactor core cooling system (ECCS) method described herein overcomes one or more of the deficiencies of prior-art systems while satisfying many requirements to prevent more nuclear accidents under the worst conditions such as happened at Fukushima in 2011. All embodiments are designed to absorb the decay heat from a large reactor after an emergency shutdown (called "SCRAM" in the industry for "Safety Control Rod Axe Man") when all internal ECCS systems have been disabled and none of the existing and prior art ECCS systems, passive or otherwise, can function. Some embodiments assume only that the reactor pressure vessel RPV can still receive and hold externally injected cooling fluid long enough to cool the nuclear fuel rods therein. Another embodiment cools a reactor under the very worst condition that the RPV is so damaged (ruptured) that it can no longer hold water around the fuel rods therein.

All embodiments are "passive safety systems" in that the only energy source needed or used for the reactor cooling operation performed is the potential energy stored in the compressed gas contained in the system. Various embodiments are installed outside nuclear plant buildings. The cooling fluid used is cooling water stored separately outside a nuclear plant and-or the compressed gas itself. The various embodiments can be installed immediately using existing proven structural components and technology from the oil and gas well drilling and the railroad industries.

The system can be installed underground or safely above ground, outside the structures housing a nuclear power station so that this ECCS system is far less susceptible to damage by acts of nature or terrorism. It does not depend on or need any of the existing ECCS systems or operational cooling systems inside a nuclear plant or any emergency backup power systems. This system requires only a connection to the external cooling water input port(s) that exist on all nuclear reactors as a last resort means to cool a reactor when all internal cooling functions are inadequate.

One embodiment, called the Compressed Gas Emergency Cooling System (CGES) employs a gas, such as air or nitrogen, that is safely stored at high pressure in a first tank and is used to pressurize cooling water in another, larger tank. Unlike other gas-over-water pressure tank schemes, the cooling water tank in this embodiment is pressurized only when it is needed during a nuclear emergency. This allows cooling water to be retained long-term in much less expensive water storage tanks. The present system can bring a reactor to "cold condition" with the reactor coolant held below 100° C. long-term. All embodiments of the present system do not need nor use continued primary coolant circulation in a SCRAMMED reactor.

Another embodiment uses a compressed air energy storage system (CAeS) to provide emergency reactor cooling by direct injection of large quantities of compressed gas. It is called NCAP for combined Nuclear and Compressed Air Power plant. The NCAP embodiment cools the fuel rods in a reactor under the worst case that the RPV is so damaged (ruptured) that it cannot hold liquid coolant. This is something that cannot be done by any other existing or approved ECCS system for water cooled nuclear reactors. The NCAP also combines a CAeS with a nuclear power station in a unique manner that achieves great reductions in operating cost and production of climate warming $CO_2$ during normal power generating operations. These reductions in cost and pollution more than pay for the addition of a CAeS plant to a nuclear plant. The NCAP embodiment is an extension of the CGES design concept. The NCAP is very appropriate for new nuclear power stations.

The CGES and NCAP systems are able to cool a large nuclear reactor for many days after shutdown when all in-plant, prior art emergency cooling systems are disabled. The CGES and NCAP systems do not require any outside emergency power for their operation. They are low in cost, easily installed, and safe. As described, they can be installed immediately using existing proven structural components and technology from the oil-gas well drilling industry and the railroad industry.

Advantages

Various aspects the present systems have one or more of the following advantages: They are passive safety systems that require no outside power and hence can be more reliable. They are or can be separate from and located away from the nuclear plant structures that contain the nuclear reactor and the in-plant emergency reactor cooling systems. They do not require external or backup power sources, other than their own stored energy. They can cool a nuclear reactor for several days after shutdown (SCRAM) when all existing in-plant cooling equipment, cooling fluid, emergency power systems are lost or disabled. They provide an add-on system that does not require major interruption of the operation of a nuclear power plant. They can be constructed with readily available and inexpensive standard components and they can be installed immediately at our aging nuclear plants. Further advantages of various aspects will be apparent from the ensuing description and accompanying drawings.

DRAWINGS

Figure 1:
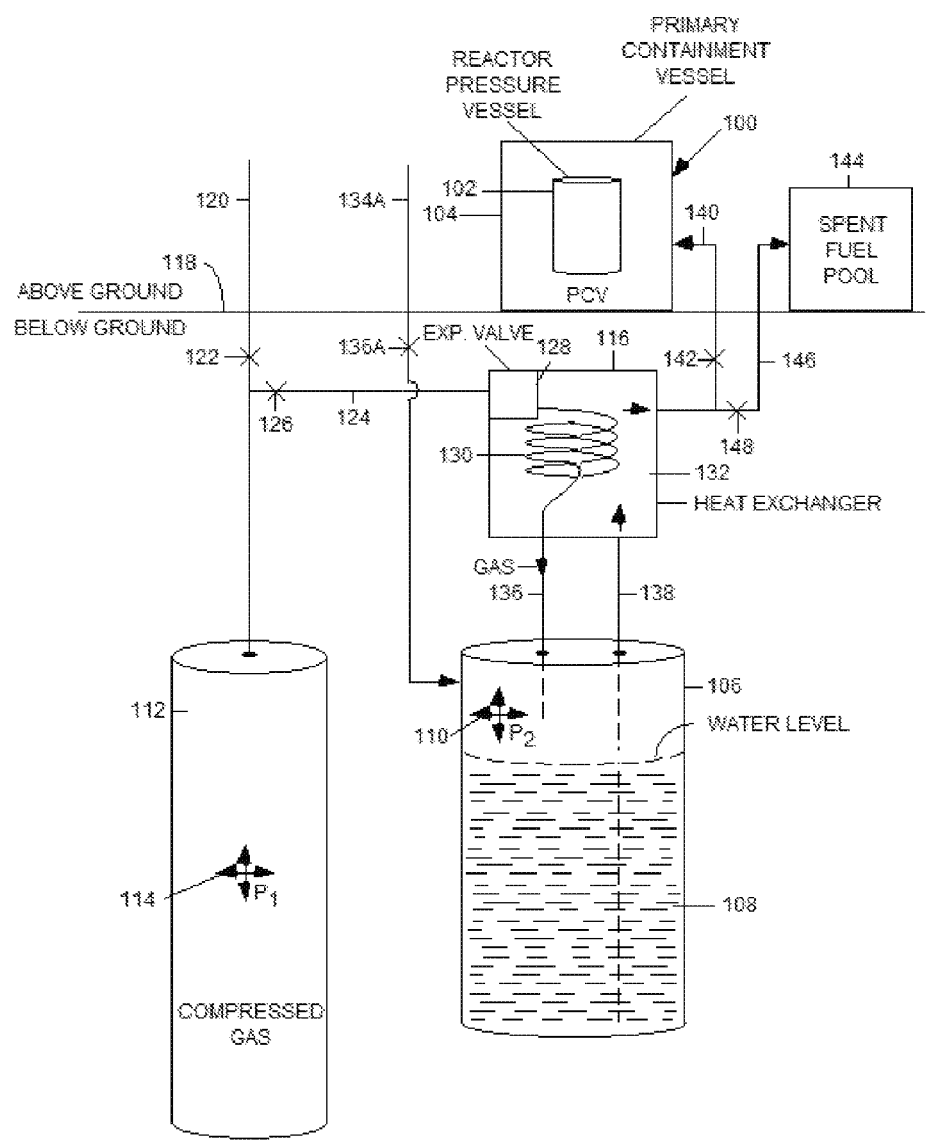
FIG. 1 shows a schematic diagram of one aspect of a CGES system.

| REFERENCE NUMERALS | | | |
|---|---|---|---|
| 100 | Nuclear power plant | 102 | Reactor pressure vessel (RPV) |
| 104 | Primary containment vessel (PCV) | 106 | Tank |
| 108 | Water | 110 | Pressure |
| 112 | Tank | 114 | Pressure |
| 116 | Heat exchanger | 118 | Ground level |
| 120 | Pipe | 122 | Valve |
| 124 | Pipe | 126 | Valve |
| 128 | Expansion valve | 130 | Coil |
| 132 | Volume | 134 | Pipe |
| 136 | Pipe | 138 | Pipe |
| 140 | Pipe | 142 | Valve |
| 144 | Spent-fuel pool | 146 | Pipe |
| 148 | Valve | 200 | Casing |
| 205 | Grout | 210 | Plug |
| 215 | Lid | 220 | Gasket |
| 225 | Blocks | 230 | Bolts |
| 235 | Brackets | 240 | Welds |
| 245 | Pipe | 255 | Valve |
| 260 | Handle | 265 | Pipe |
| 270 | Valve | 290 | Pipe |
| 295 | Pipe | 300 | Manifold |
| 305 | Valve | 310 | Valve |
| 315 | Pipe | 320 | Pipe |
| 325 | Valve | 330 | Valve |
| 335 | Valve | 350 | Manifold |
| 400 | CGES units | 405 | Pipes |
| 410 | Valves | 415 | Tanks |
| 420 | Tank | 425 | Valve |
| 500 | Railroad tank car | 505 | Track |
| 510 | Tanks | 515 | Manifold |
| 520 | Pipes | 600 | Railroad flat car |
| 700 | Housing | 705 | Trench |
| 710 | Fence | 715 | Roof |
| 720 | Tracks | 800 | CAeS system |
| 805 | Cavern | 810 | Heat exchanger |
| 812 | Coils | 814 | Pipe |
| 815 | Turbine | 820 | Generator |
| 822 | Conductors | 825 | Compressor |
| 830 | Pipe | 835 | Valve |
| 840 | Turbine | 845 | Generator |
| 850 | Conductors | 855 | Conductors |
| 870 | Valve | 875 | Pipe |
| 881 | Pipe | 900 | Fuel rods |
| 905 | Baffle | 910 | Manifold |
| 915 | Openings | 920 | Pool |
| 925 | Pipe | 930 | Valve |
| 935 | Pipe | 940 | Valve |
| 945 | Pipe | 950 | Valve |
| 1100 | Plate | 1105 | Plate |

ABBREVIATIONS

CG Compressed Gas
CAeS Compressed Air Energy System
CGES Compressed Gas over Water Emergency Reactor Cooling System
DPCS Prior-Art Depressurization and Cooling System
GJ GigaJoules
MW MegaWatts
MJ MegaJoules
NCAP Combined Nuclear and CAeS Power plant design
PCV Primary Containment Vessel
RPV Reactor Pressure Vessel
RRTC Railroad Tank Car SCRAM Safety Control Rod Axe Man—an emergency shutdown of an operating nuclear power plant.
SFP Spent Fuel Pool Overview In one embodiment, CG is safely stored at high pressure in one tank and is used to pressurize cooling water in another, larger tank. The CG is admitted to pressurize the cooling water when it is needed during a nuclear emergency. In one aspect the heat required for rapid expansion of large volumes of the CG is extracted from the water that is pressurized by the expanding gas. Equal volumes of water and expanded gas pass through a heat exchanger so that there is always sufficient heat energy for the gas to expand. The temperature drop in the water due to contact with the expanding gas is small. In another aspect, very large quantities of CG from a CAeS plant are used to cool a companion nuclear reactor by the expansion of the compressed gas alone inside the reactor during emergencies. This aspect provides great cost savings to the CAeS during normal power generation that pays for the CAeS installation near a companion nuclear power station. A CAeS is a relatively inexpensive power plant (3% or less of the cost of a nuclear plant) that can be installed outside existing or new nuclear power stations.

The NCAP embodiment provides greatly enhanced safety for a nuclear plant and major cost and pollution reduction for a companion CAeS plant that has heretofore not been available. The cost reduction and improved profitability for the CAeS plant pay for combining the two power plants in one location as described in connection with this embodiment. The NCAP is a passive safety system in that it does not require any other external power supply or energy source other than the compressed gas stored in the CAeS plant. The NCAP is a passive safety system that does not require any other external power supply or energy source.

There is an additional advantage inherent in the NCAP embodiment. If the ECCS safety systems in a nuclear plant are operational but the plant has lost its emergency backup power (as happened at Fukushima), the companion CAeS system can immediately supply the backup electrical power needed by the ECCS systems in the companion nuclear plant.

The examples used herein are calculated to meet the emergency reactor cooling requirements for a 1300 MW electrical nuclear power station with a nuclear reactor that produces 3900 MW of thermal heat energy. The decay heat from the reactor fuel rods immediately after the reactor shutdown is assumed to be 7% of the rated 3900 MW thermal, equal to 273 MW immediately after shutdown, reducing to 1.5% after one hour. These values are used for explanatory purposes and are not intended to be limiting in any way. Those skilled in the art of nuclear power plant design will understand how to scale the emergency cooling system described herein to fit smaller and larger nuclear power plants.

First Embodiment—FIG. 1

FIGS. 1 to 4 show aspects of one CGES embodiment. In one aspect of this embodiment, unpressurized water in a large tank is pressurized by compressed gas that is kept at high pressure in a separate tank. The water is pressurized only when it is needed during a nuclear emergency. The heat required for rapid expansion of large volumes of the compressed gas is taken from the pressurized water as it circulates around an expansion valve and coil combination and through a heat exchanger. Since equal volumes of water and expanded gas pass through the heat exchanger in a given time, the temperature drop in the water is small.

Figure 2:
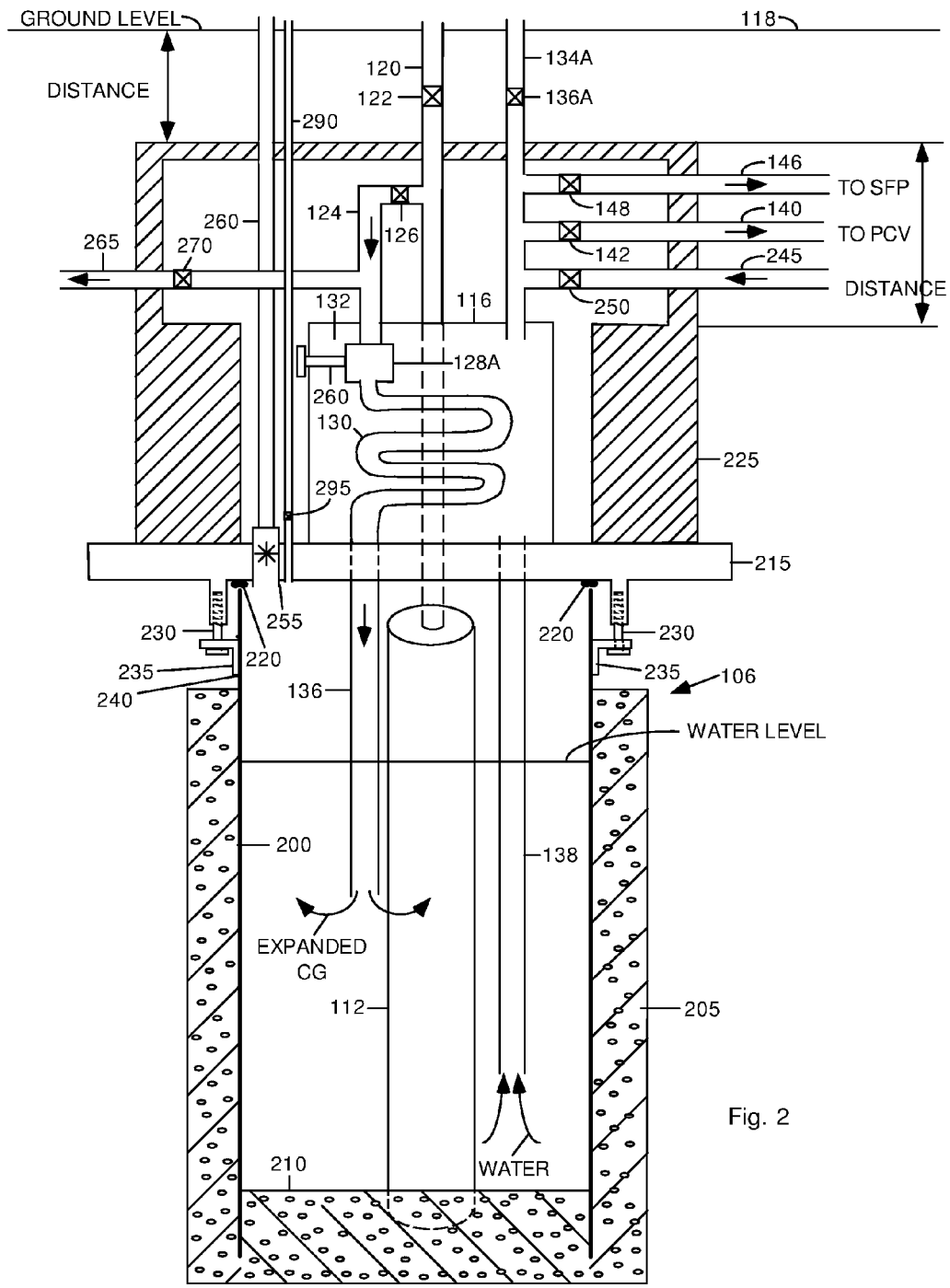
FIG. 2 is a cross-sectional view of one aspect of a CGES system.

FIG. 1 shows a schematic diagram of one aspect of a CGES system, while FIG. 2 shows one physical realization of the system of FIG. 1. The system comprises a nuclear power plant with a reactor pressure vessel (RPV) 102 that is housed within a primary containment vessel (PCV) 104. A first storage reservoir tank 106 contains water 108 at ambient pressure 110. A second storage tank 112 contains CG at high-pressure 114, a heat exchanger 116, and a plurality of valves and interconnecting pipes. Tanks 106 and 112, heat exchanger 116, and a portion of interconnecting pipes are located beneath ground level 118.

A pipe 120 extends from tank 112 to a valve 122 and then to a point above ground level 118. Another pipe 124 connects to pipe 120 at a point between valve 122 and tank 112. Pipe 124 connects pipe 120 to heat exchanger 116 via another valve 126.

Heat exchanger 116 comprises an interior volume and has a pressure regulator and expansion valve 128 and a coil 130. Valve 128 is one of many standardized pressure regulator and expansion valve designs commonly used in the compressed gas industry. Valve 128 is connected to pipe 124 at the right-hand side of valve 126. Pipe 138 delivers pressurized water from the bottom of tank 106 to volume 132 in heat exchanger 116. Additional pipes 136, 138, and 140 extend from heat exchanger 116 to tank 106 and plant 100. Pipe 136 extends from coil 130 in heat exchanger 116 to the top of tank 106. Pipe 138 extends from a point near the bottom of tank 106 to volume 132 in heat exchanger 116. Pipe 140 extends from internal volume 132 of heat exchanger 116 to plant 100 via a valve 142.

Expansion valve 128 is shown inside heat exchanger 116 to depict that it is constantly surrounded by water in heat exchanger 116. Valve 128 is of sufficient design and surface area to absorb the heat needed to keep its components at acceptable operating temperatures. Coil 130 depicts additional surface area for heat transfer that may be an integral part of valve 128.

Pipes 120 and 134 extend above ground for access to CG for tank 112 and water for tank 106.

After their usefulness in a nuclear reactor is over, nuclear fuel rods still generate heat from nuclear decay and are usually stored in a cooling water bath to prevent overheating. Spent fuel rods are removed from reactor 100 and stored in a spent-fuel pool (SFP) 144. Emergency cooling water is delivered to pool 144 by a pipe 146 when valve 148 is opened.

Pipes 120, 124, 134, 136, 138, and 140 are securely and leaklessly sealed to tanks 106 and 112, heat exchanger 116, and plant 100 at their points of entrance and exit.

Operation—FIG. 1

In FIG. 1, the external ECCS system pumps cooling water into plant 100 during a nuclear emergency to prevent a meltdown when in-plant Emergency Core Cooling systems are disabled or damaged. It can inject large volumes of cooling fluid immediately into a reactor 102 even if there is still pressure in the reactor vessel (RPV) 102 so long as the pressure in tank 106 is greater than the water-steam pressure in RPA 102. The pressure in tank 106 can be as high as 20.7 bars (300 psi) for a tank 106 holding over 100 m$^3$ of cooling water (see design example below). One of the most dangerous situations in a nuclear plant is a sudden loss of cooling water in the RPV 102 and the nuclear fuel rods therein are no longer covered by cooling fluid. The RPV pressure can drop well below 20.7 bars. The CGES system can immediately inject cooling water at a rate as high as 6500 l/m to absorb all the decay heat from a 1300 MWe (3900 MW thermal) nuclear reactor (273 MW initial rate after SCRAM). A full ECCS system to provide up to three days of reactor cooling will comprise many CGES modules as shown in FIG. 1.

Figure 3:
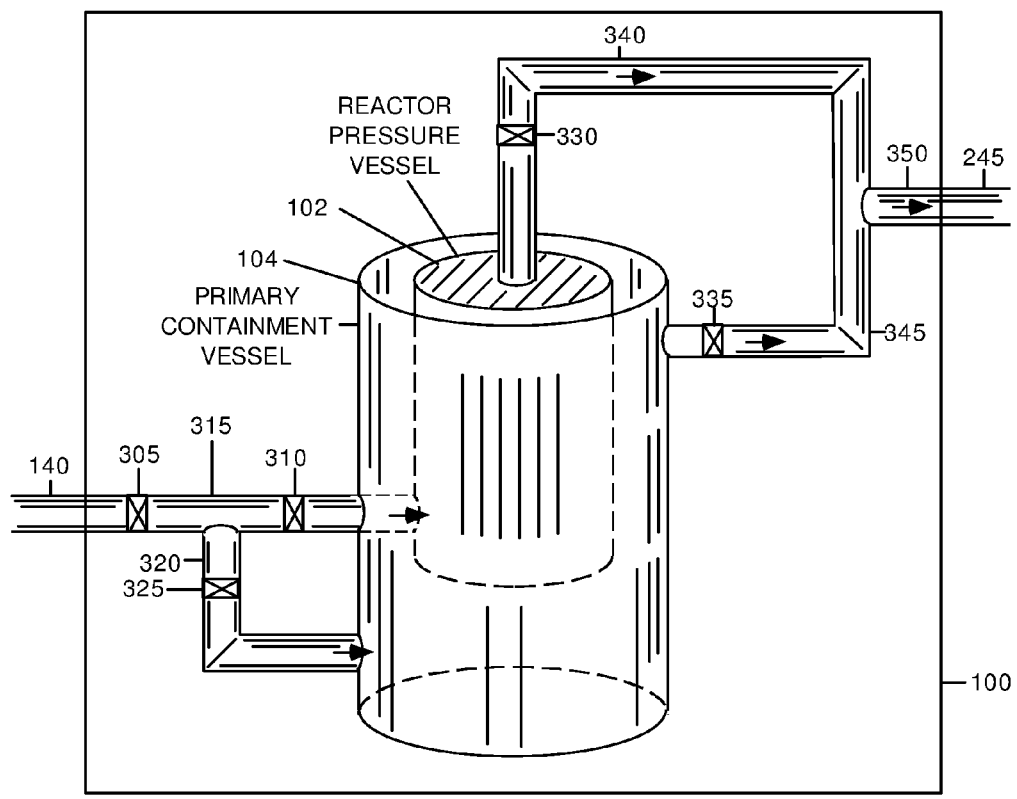
FIG. 3 is a schematic diagram of a nuclear power plant showing fluid flow after a SCRAM.

Valve 126 is first opened manually or automatically, allowing high pressure compressed gas (CG) from tank 112 to enter expansion and pressure regulator valve 128 in heat exchanger 116. Gas flows from valve 128, through coils 130, through pipe 136, and into tank 106. The pressure exerted on the surface of the water in tank 106 urges the water upward through pipe 138, into volume 132 of heat exchanger 116, and out into pipes 140 and-or 146. As stated, the heat required for rapid expansion of large volumes of the compressed gas is taken from the pressurized water as it circulates around expansion valve 128 and coils 130 in heat exchanger 132. When valve 142 is manually or automatically opened, water flows outward through pipe 140 and onward to manifold 300 of plant 100. The water delivered under pressure to manifold 300 is sent to reactor pressure vessel 102 or primary containment vessel, 104, as needed, by selectively manually or automatically operating valves 305, 310, and 325 (FIG. 3).

FIG. 2—Description

FIG. 2 is a cross-sectional view that shows a physical example of one aspect of the system of FIG. 1. FIG. 2 shows additional components that strengthen the design in FIG. 1 in order to contain the high pressures during both storage and operation.

The present aspect shown is an underground version of the CGES system. In this embodiment, CG tank 112 is mounted inside cooling water tank 106. This is an embodiment that allows both tanks to be contained in one bore hole that is constructed by standard oil-gas well drilling techniques.

When valve 126 is open, CG from tank 112 flows into pressure reduction valve 128. Control device 260 adjusts the pressure of CG leaving valve 128 to keep the pressure in tank 106 below the maximum allowable level.

Valve 128 is manually or automatically adjusted to set the pressure of CG from tank 112 entering coils 130 of heat exchanger 116. Safety relief valve 255 assures that the maximum allowable pressure in tank 106 is not exceeded. Adjustable flow rate valve 142 controls the rate of pressurized water leaving tank 106 which determines the rate of expanded CG allowed into tank 106 when valve 126 is open. Water flowing from tank 106 through volume 132 of heat exchanger 116 provides the heat needed to prevent freezing of components in 116 or water in tank 106 by the expanding gas from tank 112. A tank 106 is formed within a borehole of predetermined depth and diameter in the earth. The tank has a cylindrical steel casing 200 that is open at both ends and has a diameter less than that of the borehole. During installation, casing 200 is lowered into the borehole and securely held a short distance above the bottom. Standard grouting procedures from in the oil-gas well drilling industry are used to insert concrete grouting material 205 between casing 200 and the bottom interior of the borehole to form a concrete plug 210 at the bottom of the borehole and grouting 205 around casing 200.

Grouting 205 and plug 210 are of sufficient size and composition to prevent significant leaking of fluids contained therein or damage to casing 200 at the operating fluid pressures utilized. A lid 215 closes tank 106 at the upper end of casing 200. A gasket 220 or other sealant means is placed between the top of casing 200 and the bottom surface of lid 215 to prevent gas leakage when the present system is activated.

A number of concrete blocks 225 are placed atop lid 215 to further weigh it down against the top of casing 200 and gasket 220, thereby forming a tight seal for tank 106. A plurality of bolts 230 further secure lid 215 to casing 200. Brackets 235 are secured to casing 200 by a plurality of welds 240. Bolts 230 clamp lid 215 securely in place on tank 106.

At the upper right of FIG. 2, an additional inlet pipe 245 is connected to pipe 134A via a valve 250. Inlet pipe 245 is connected to an outside source such as reactor pressure vessel (RPV) 102, primary containment vessel (PCV) 104, spent-fuel pool (SFP) 144 or another source for return or delivery of water to tank 106. Water is also delivered to tank 106 through pipe 134A via valve 136A, heat exchanger 116, and pipe 138.

A vent line 290 and a valve 295 are used to vent air from tank 106 when fluid is added via pipes 134A and 138 or pipe 245. Valve 295 is opened to vent displaced air from tank 106; otherwise it is closed.

The fluid returned from plant 100 to tank 106 can be the hot fluid generated in the RPV from the cooling water initially injected by this tank 106 or other tanks 106 into plant 100. In this manner, the reactor cooling capacity of water initially stored in tanks 106 can be extended.

A few days after SCRAM, the decay heat rate falls below 0.4% of rated reactor thermal power. When the heat transfer rate through the casing 200 of one of more tanks 106 equals or exceeds the decay heat rate in a reactor, a CGES system comprising several tanks 106 can cool the reactor indefinitely by recycling the cooling water in tanks 106.

Underground tank 106 that is in a deep bore hole as shown in FIG. 2 can maintain a substantial heat transfer rate through its steel casing 200 and concrete grout 205, especially if the bore hole passes through underground aquifers where water is in constant contact with the outside grouting 205.

The above cooling water recycling capability of the present CGES system is important in comparison to the AP1000 system, supra. The AP1000 cannot return a reactor to a cold condition where the coolant is less than 100° C. The AP1000 must have continuous hot fluid in the reactor vessel to maintain circulation of the primary coolant through a heat exchanger that uses the gravity water from the AP1000 system tank to absorb decay heat from the hot primary coolant. In contrast to the AP1000, the CGES, by recycling its cooling water as described, can cool a reactor below 100° C. and maintain that condition long-term.

Moreover the CGES does not require Sato's DPCS apparatus, supra, to bring the reactor to cold shutdown condition. Both the AP1000 and Sato's apparatus use reactor primary coolant circulation to cool the reactor. They are critically dependent on plumbing internal to the nuclear plant, but such plumbing can be disabled by attacks by nature or terrorists. In contrast, the present CGES cooling operation does not use the primary boundary plumbing connected to the reactor pressure vessel (RPV). The CGES system is effective even if the internal plumbing is damaged and cannot retain coolant in the primary boundary. The CGES system injects new coolant into a reactor through the external coolant input port and constantly replaces the coolant in the reactor anytime it is not covering the fuel rods in the reactor. The CGES coolant is constantly evaporated to absorb maximum decay heat and then vented out of the reactor pressure vessel (RPV) as water vapor, which is then replaced by more CGES coolant. The CGES system works best when any hot primary coolant is vented out of the RPV after a SCRAM so that the injected CGES coolant is not wasted absorbing the heat from the left-over primary coolant.

The safety pressure release valve 255 below lid 215 allows venting of excess pressure within tank 106 whenever the pressure exceeds a pre-set maximum allowed pressure (usually less than 21 bars for a tank 106 greater than 1 meter in diameter). A pipe 260 extends from valve 255 to the air above ground level for venting. In various aspects an embodiment can have two or more safety relief valves 255 mounted on tank 106 for redundancy in this critical component that protects tank 106 from excessive pressures.

In the present aspect, gas expansion valve 128A includes a handle 260 for adjustment of the output pressure of valve 128A.

Valves 126, 142, 148, and 270 all are one-way (check) valves that allow flow only in the direction of the arrows shown in the respective lines. These check valves prevent backflow into the lines in case of excessive pressures on the other side of the valve, i.e., as in line 140 where the excessive pressure in the RPV or PCV could force water back into tank 106 and damage it. Pipe 265 allows the CG in tank 112 to be directed elsewhere when valves 126 and 270 are open. For example, when the CG in tank 112 is nitrogen, the nitrogen can be used to recharge nitrogen supplies that are used to operate valves in a nuclear plant or to flood a reactor vessel with inert nitrogen to reduce known hazards of oxidation of metals in the fuel rods and to prevent an explosion of hydrogen gas.

Exemplary Design Specifications and Dimensions for Tanks

The following are specifications for tanks 106 and 112 in an exemplary CGES system.

1. Tank 106 has a volume of 100 m$^3$ (cubic meters).
2. Tank 112 has an initial CG pressure of 200 bars (3000 psi). A maximum pressure of 20.7 bars (300 psi) is present in water tank 106 during a nuclear emergency to limit internal hydraulic forces in tank 106 (as controlled by valve 128A in FIG. 2).
3. The volume ratio of tank 106 to tank 112 is 10:1 (100 cubic meters of water to 10 cubic meters of CG).
4. Cooling water must be delivered from tank 106 at a rate of 6552 l/m (1731 gpm) to handle the maximum decay heat rate of 273 kJ per sec (7%) from a 3900 MW thermal reactor immediately after SCRAM (assuming 2,500 MJ per m$^3$ heat absorbed by injected cooling water raised from 20° C. to full evaporation in the reactor).
5. Tank 106 has an inside diameter of 1.19 m (47 in) and is 100 meters deep with a gross volume of 112 m$^3$. The wall thickness of tank 106 is 0.95 cm (0.375 in). The critical stress in the wall of tank 106 with internal gas pressure 20.7 bar (300 psi) is 1,296 bar (18,800 psi). (This assumes no support from the concrete grouting outside the well casing in case tank 106 is in a borehole.)
6. Tank 112 has an inside diameter of 0.357 m (14.06 in) and is 100 meters deep to yield a volume of 10 m$^3$. The wall thickness of steel pipe for tank 112 must be at least 2.68 cm (1.054 in) to keep the critical stress in the wall of this tank no greater than 1,379 bars (20,000 psi) for the internal gas pressure of 20.7 bars (3000 psi).
7. The maximum expansion of the CG from tank 112 will be 11:1 when tank 106 is empty. The final pressure in tank 106 will be 200 bars divided by 11=18.2 bar (264 psi). This is enough remaining pressure to lift the last water in tank 106 up to a height of 186 m (609 ft).
8. At a pressure of 20.7 bars (300 psi) in tank 106 with a diameter of 1.19 m (47 in), the upward force on lid 215 (FIG. 2) is 2,315,300 N (520,500 lb). The 1.19 m diameter casing 200 of tank 106 with 0.95 cm thick steel wall can resist an upward force of 4,525,542 N (1,017,400 lb) with a maximum 1,379 bar (20,000 psi) stress in the casing wall when lid 215 is securely attached to casing 200. This is 2.1 times the actual load force in the casing wall due to the upward force of 2,315,300 N, for a safety factor of 2.1. The pressure in tank 106 could increase to 2.1 times 20.7 bars=43.5 bars and not exceed the stress limit of 1,379 bars in the wall of tank 106.
9. Concrete weight 225 on tank 106 should be 444,800 N (100,000 lb) as an added safety factor to resist the upward hydraulic force on the top of tank 106 and reduce the load on the outer part of lid 214. Fifty tons of concrete requires 19.12 m$^3$ (25 cu yd) of concrete at 2,406 kg per m$^3$ (4,000 lb/cu yd).

A heat transfer rate of 10. 25 KW into the CG is required for it to expand by 10:1 at a rate of 0.1092 m$^3$/s (1800 gpm) to propel water out of tank 106 at the same volume rate. 25 kW is $2_5$ kJ/s taken from the water leaving tank 106 at the rate of 0.1092 m$^3$/s m$^3$/s. The specific heat of water is 40.18 MJ/m$^3$/deg C. The CG takes only 25 kJ from each 0.1092 m$^3$ of water that flows through heat exchanger 116. This is a rate of 228 kJ/m$^3$ of water. The temperature drop per m$^3$ of water is 228 kJ/m$^3$ divided by 40.18 MJ/m$^3$/° C.=0.05° C. Thus the water temperature drops by far less than 1° C. as it flows out of tank 106.

A person skilled in the art of physics or engineering can scale the above design example to other workable dimensions for tanks 106 and 112 and CG pressures as appropriate. All metal components shown in FIG. 2 are steel or another alloy that is sufficiently strong to meet the design requirements of the CGES and are not susceptible to corrosion in the environment shown.

Connection of CGES to Plant 100—FIGS. 2 and 3.

FIG. 3 shows a schematic diagram of a nuclear power plant that illustrates paths that cooling fluids take after SCRAM. When a CGES is activated, water leaves tank 106 (FIG. 2) and is delivered to plant 100 via pipe 140 or inlet manifold of plant 100. A shut-off valve 305 on manifold 140 is opened to admit water into plant 100. A pipe 315 conducts water to a valve 310. A pipe 320 branches from pipe 315 and conducts water to a valve 325. When valve 310 is open, water is directed into reactor pressure vessel 102. When valve 325 is open water is directed into primary containment vessel 104. Either or both of valves 310 and 325 can be opened, depending on cooling requirements after a SCRAM in plant 100.

Additional valves 330 and 335 are opened as appropriate to conduct water and steam from reactor pressure vessel 102 and primary containment vessel 104 to a manifold 350 within plant 100. Manifold 350 is connected to pipe 245 (FIG. 2) so that water and steam from plant 100 can be returned to tank 106 if desired.

First Embodiment Operation—FIGS. 1 to 3

In the following example a CGES module as shown in FIG. 2 has been installed and connected to a plant 100 (FIG. 3). All aboveground connections to the CGES are sealed to prevent unwanted matter from entering the system. All valves in the CGES system are initially closed.

Preparing CGES for Use.

A source of water (not shown) is connected to pipe 134A and valve 136A is opened. A predetermined amount of water flows through pipe 134A and volume 132 of heat exchanger 116 and into tank 106. When the amount of water supplied fills approximately 95% of tank 106, valve 136A is closed, stopping the delivery of water to tank 106.

A source of high-pressure gas (air, nitrogen, or other gas) is connected to pipe 120 and valve 122 is opened. Gas is urged from the source into tank 112. When a predetermined pressure is reached, valve 122 is closed, stopping the delivery of gas into tank 112. When the delivery of gas and water to the CGES system is complete, the sources of gas and water are optionally removed or left in place.

Activating CGES after SCRAM.

As with the system of FIG. 1, assume that a disaster occurs so that a reactor 102 must be shut down under emergency conditions (SCRAM). To prevent a meltdown, the present system pumps cooling water into plant 100. Valve 126 is first opened manually or automatically allowing gas from tank 112 to enter expansion and pressure regulator valve 128A in heat exchanger 116. Gas flows from valve 128A, through coils 130, through pipe 136, and into tank 106. The pressure exerted on the surface of the water in tank 106 urges the water upward through pipe 138, into volume 132 of heat exchanger 116, and out into pipe 134A. When valve 142 is opened manually or automatically, cooling water flows outward through pipe 140 and onward to manifold 300 of plant 100. The water delivered under pressure to manifold 300 is sent to reactor pressure vessel 102 or primary containment vessel, 104, as needed, by selectively operating valves 305, 310, and 325 (FIG. 3) manually or automatically.

Valve 128A control device 26o is manually or automatically adjusted to control the pressure of CG leaving valve 128A so that it does not exceed the maximum pressure allowed in tank 106.

Other CGES Activities—Delivering Water to an SFP.

A pipe 146 (FIG. 3) is connected to an SFP (not shown) for delivery of cooling water to any spent fuel rods that still give off heat and must be cooled when normal plant 100 cooling water circulation is disabled. Starting with all valves closed and sufficient gas in tank 112 and water in tank 106, valves 126 and 260 are opened and valve 260 is adjusted so that pressure inside tank 106 is sufficient to urge water to flow out pipe 146. Valve 148 is then opened and water flows to SFP from tank 106 until either tank 106 empties or sufficient water is delivered. Valve 148 is then closed and gas and water supplies to the CGES are restored, if necessary.

Recovery and Recycling of Water and Steam from Plant 100.

In FIG. 2, a pipe 245 is connected to outflow manifold 350 of plant 100. Initially, all valves are closed. When it is desired to return water from plant 100 to a tank 106, valve 250 is opened and water and-or steam flows from plant 100 back into tank 106. This feature allows the venting of the initial high-pressure water and steam in a SCRAMMED nuclear reactor 102 back into empty tanks 106 instead of venting the radioactive steam into the environment. This is extremely important when it is necessary to inject cooling water into a reactor 102 that has reached its maximum heat content and internal pressures because it cannot circulate and cool its existing cooling fluid. By this means, the pressure and water-steam in a reactor 102 can be reduced to allow injection of new cooling water from tanks 106.

Return pipe 245 also allows the CGES embodiment in FIGS. 2-5 to perform long-term cooling of a reactor 102 beyond the critical first days after a SCRAM. Cooling water from a tank 106 that is heated in and then evaporated out from a reactor 102 can be returned to other empty tanks 106 for later reuse as cooling water. In this manner, the cooling capability of an initial amount of water in a set of tanks 106 can be extended indefinitely after the decay heat rate in a reactor 102 drops low enough so that cooling water from tanks 106 can be recycled and condensed in empty tanks 106 faster than it is needed to cool reactor 102. In particular, deep underground tanks 106 as shown in FIG. 2 can provide substantial cooling for water and-or steam recycled from a reactor 102 as described above. This CGES embodiment eventually can cool a reactor below the desired "cold shutdown" condition whereby the temperature within the reactor is less than 100 degrees C.

The CGES system is a substantial improvement over the AP1000 system. The AP1000 system requires continuous primary cooling water circulation through a reactor. The CGES embodiment can cool a reactor even after its primary cooling water has been lost.

Delivery of Gas to Another Location.

A pipe 265 in FIG. 2 branches from pipe 124 and is arranged to deliver compressed gas to other locations. For instance, if the compressed gas is nitrogen, the nitrogen can be delivered to storage tanks within a nuclear plant 100 for nitrogen actuated control valves. When it is desired to deliver gas through pipe 265, valves 126 and 270 are opened and gas from tank 112 exits the CGES via pipe 265. Closing either valve 126 or 270 stops the delivery of gas.

Figure 4:
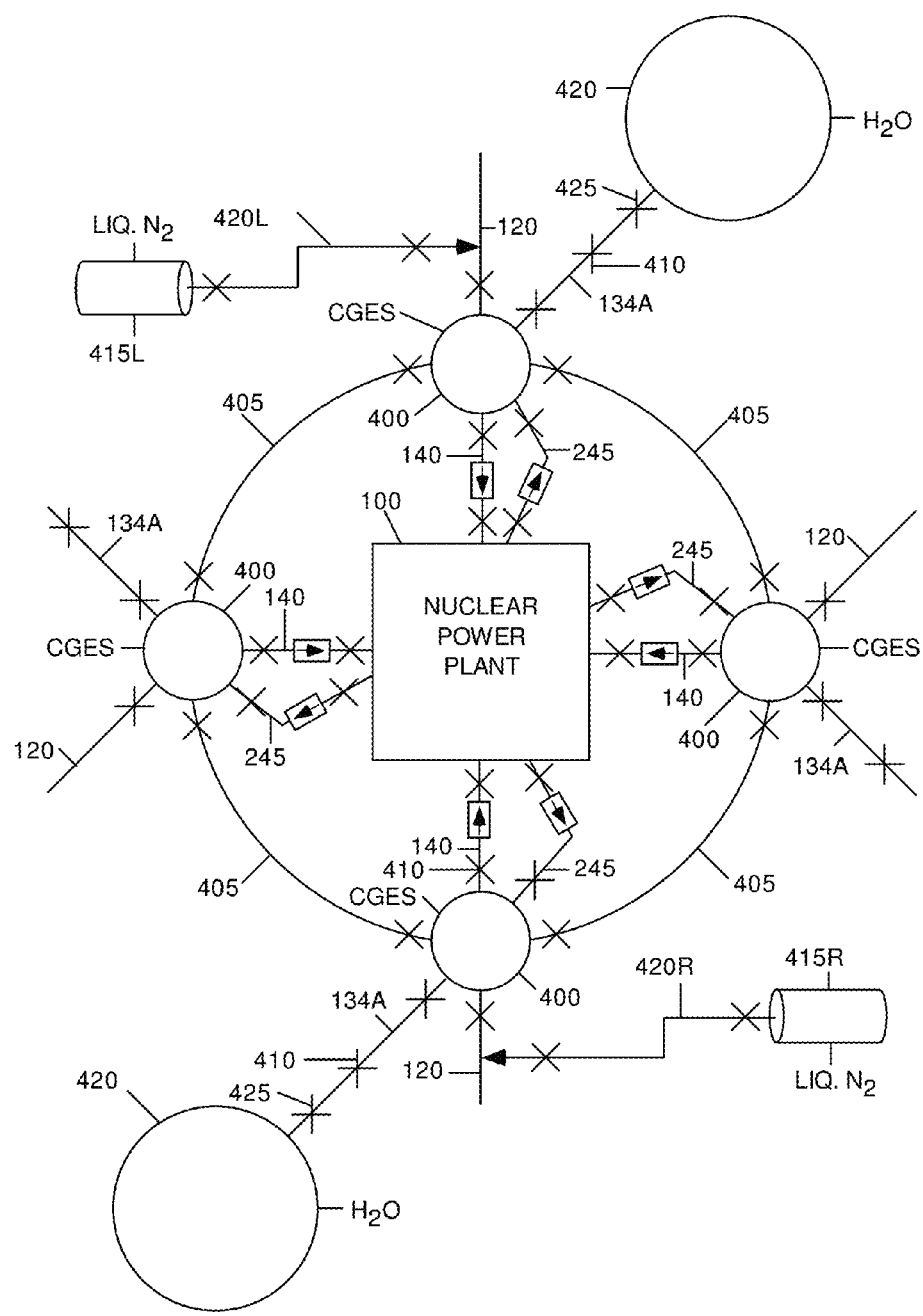
FIG. 4 is a schematic plan view showing a plurality of CGES units connected to a nuclear plant.

First Alternative Embodiment—Description and Operation—FIG. 4

FIG. 4 is a schematic plan view of one aspect in which a plurality of CGES units 400 are connected to a nuclear plant 100. This arrangement provides redundancy in case one or more CAES units are damaged or inaccessible. Each CGES unit 400 has a CG tank and a water tank, similar to tanks 112 and 106 of FIG. 1.

A plurality of pipes 405 connects the water storage volume in each of tanks 106 within CGES units 400 to that of its neighbors. Another plurality of pipes 140 is arranged to deliver water to plant 100 when required after a SCRAM, as explained above. An additional plurality of pipes 245 is arranged to pass water and steam back from plant 100 to CGES units 400. Manual on-off valves 410 are installed at the beginning and end of each pipeline segment so that a damaged or leaking pipeline segment can be isolated by closing the appropriate valves 410. Some or all of valves 410 are automatic if required. Additional pipes 120 and 134A permit CG and water from external sources to be injected into tanks 112 and 106, respectively.

Additional tanks 415L and 415R contain liquid nitrogen that is delivered to pipes 120 via pipes 420L and 420R, respectively. The liquid nitrogen in these tanks is used to recharge tanks 112 106 (FIG. 1) as necessary. Additional tanks 420 are above-ground, standard water storage tanks of the type commonly employed by water utility districts for bulk storage of water. Their capacity is typically 3,700 m$^3$ (1,000,000 gal.) or more. Tanks 420 replenish the water in tanks 106 in CGES units 400 (FIGS. 1 and 2) for long-term reactor cooling operations after the critical first days after reactor shutdown.

Valves 425 control water flow from tanks 420 to tanks 106 in CGES units 400 over lines 134a. Many tanks 420 can be stationed around a nuclear plant and connected as shown to any or all of tanks 106 in CGES units 400. Water is stored in tanks 420 at ambient atmospheric pressure, and flows from tanks 420 to tanks 106 by gravity. When no pressure is in reactor 102 and the reactor is underground below the level of tanks 420, water from these tanks can be sent directly to the reactor 102 by appropriate settings of pipeline valves shown in FIG. 4.

All pipes are placed on or under open buffer areas or beneath parking areas around plant 100 so that there is no loss of surface space around plant 100.

Figure 5:
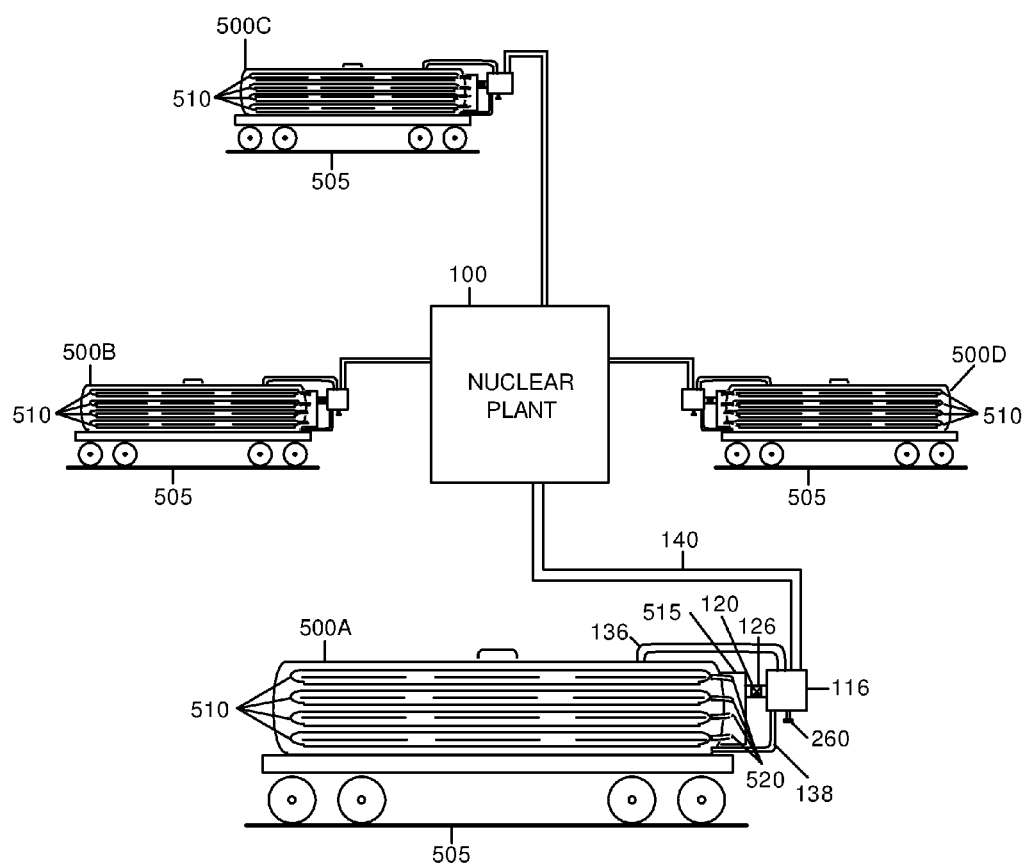
FIGS. 5 to 7 show aspects of an embodiment of a CGES using standard railroad tank cars for water storage.
Figure 6:
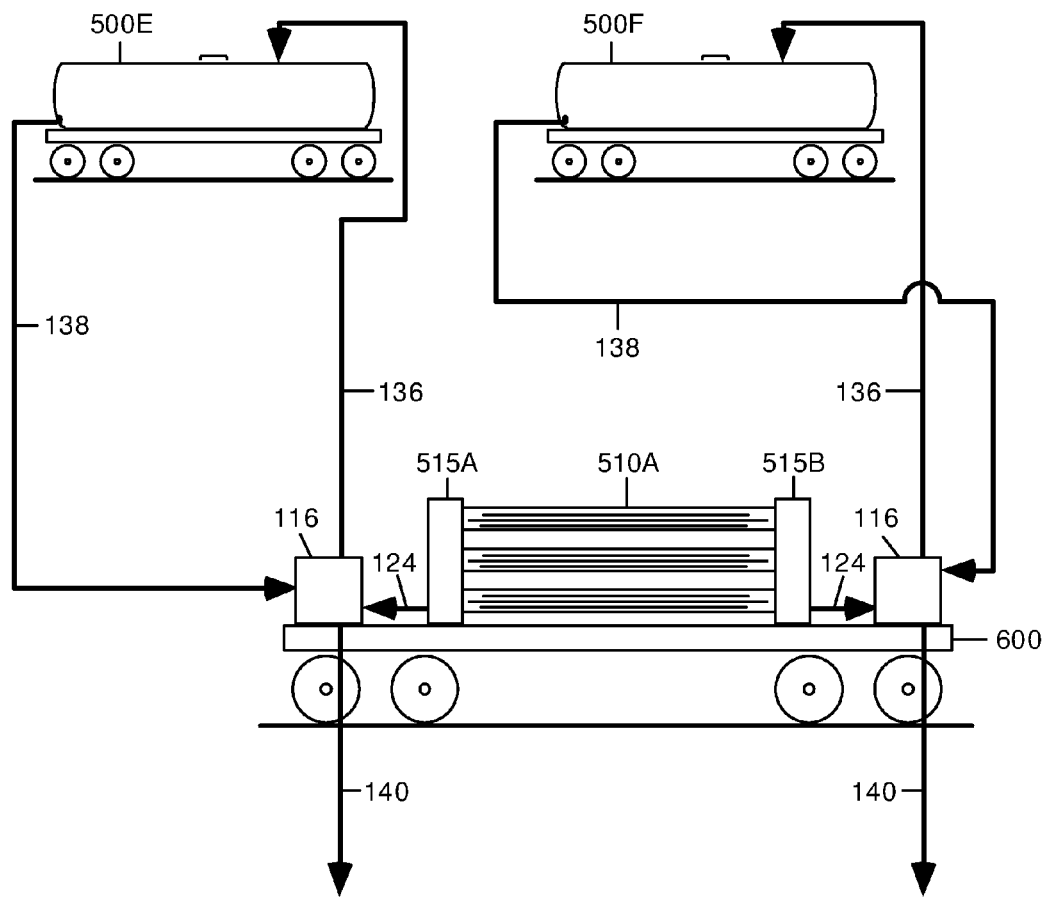
Figure 7:
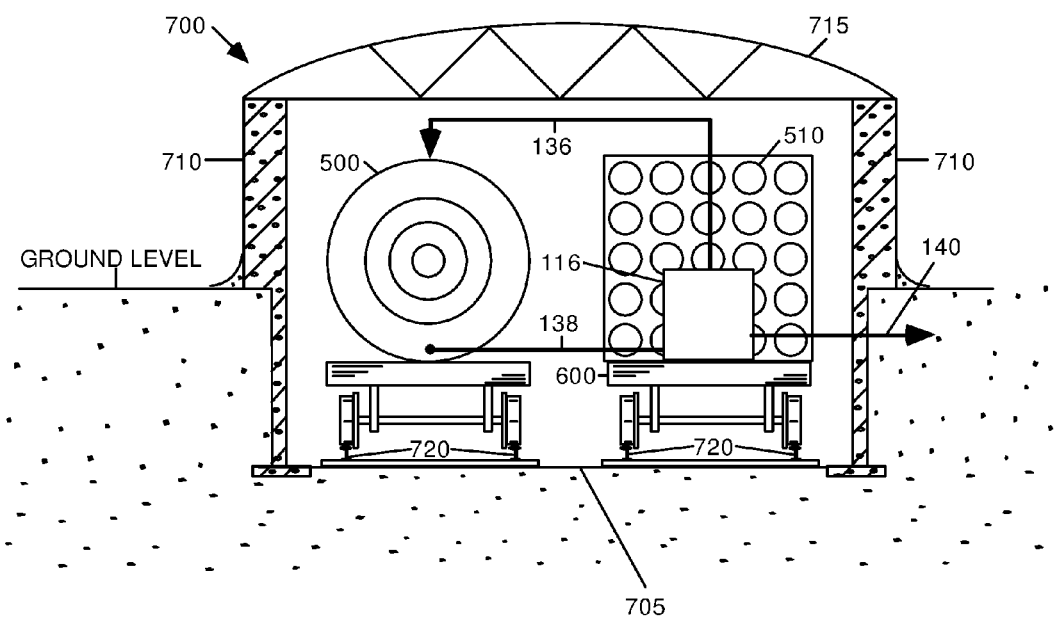

Second Alternative Embodiment—Description and Operation—FIGS. 5 to 7 Above Ground Versions of the CGES System—First Version FIGS. 5 to 7 show aspects of an embodiment of the CGES system that uses standard railroad (RR) tank cars for transporting an above-ground version of water storage tank 106 (FIG. 2). With CG tanks 112 attached to each tank car or supplied separately, this provides a simple, inexpensive, and very reliable CGES system that can be installed immediately at most any nuclear power station. This CGES system embodiment is called an RRTC (Railroad Tank Car) system. The RR tank car CGES modules comprise portable units that can be transported from one location to most any other nuclear plant in trouble within 24 hours.

FIG. 5 is a schematic view showing a plurality of railroad tank cars 500A through 500D in the vicinity of a nuclear plant 100. Cars 500 are moved on a plurality of track segments 505 that are located at predetermined positions and distances in the vicinity of plant 100. Although four tank cars are shown, fewer or more can be used.

Railroad tank cars can hold up to 128.7 m$^3$ (34,000 gal.) of liquid, with some older tank cars holding up to 189.27 m$^3$ (50,000 gal.). Although rail cars 500 serve the function of tank 106 (FIG. 2), they have greater capacity than the 100 m$^3$ capacity of tank 106 used in the design calculation example above. A plurality of tanks 510 is mounted on each rail car. Tanks 510 serve the function of tank 112 (FIG. 2). In one aspect, each of tanks 510 is a 15.2 m long, 0.36 m in diameter high-pressure steel pipe, and there are between 6 and 8 tanks 510 on each rail car. The combined volume of the 6 to 8 tanks 510 is about equal to that of tank 112 used in the design example above to provide at least 10 m$^3$ of CG at 200 bars (2900 psi) of pressure.

Railroad tank cars can withstand internal gas pressures up to 6.9 bars (100 psi). That is more than enough pressure to force water at high flow rates into plant 100 during a nuclear emergency.

In FIGS. 5 to 7, the same pipelines and valves that interconnect CG tank 112 to water tank 106 in FIG. 2 (with the same reference numbers) are used to connect tanks 500 and 510. Although present as indicated in FIG. 2, valves, other than valve 126, are not shown in FIGS. 5 to 7.

In FIG. 5, tank car 500A is expanded to better show the components used in this aspect of the present embodiment. The rail car tank on cars 500 is equivalent to tank 106 in the first embodiment. Tanks 510 are connected to a sealed manifold 515 by a plurality of pipes 520. Tanks 510, pipes 520, and manifold 515 are collectively equivalent to tank 112 in the first embodiment. When valve 126 is opened, CG flows from manifold 515, through pipe 120 and valve 126 into expansion and pressure regulator valve 128A (FIG. 2), indicated by pressure adjusting handle 260, through heat exchanger 116, and out via pipe 136 to pressurized tank 500A. Pressurized water flows out line 138 from tank 500A into heat exchanger 116 and then out pipe 140 to plant 100. Thus pressure is applied to the interior of tank 500A via pipe 136 and water is urged to leave tank 500A via pipe 138, passing through volume 132 of heat exchanger 116, and finally on to plant 100 via pipe 140.

The RRTC system sacrifices some protection against assault by acts of nature or terrorism that are inherent in the underground CGES system of the first embodiment. However the immediate availability of many railroad tank cars and flat cars around the industrialized world makes the RRTC system a very practical and inexpensive CGES that can be protecting a nuclear power plant within a few months from the start of installation, at very little cost. The RRTC has all the operational characteristics of the other CGES embodiments described above.

Second Version—FIG. 6

FIG. 6 is a schematic diagram showing an alternative form of the tank car system of FIG. 5. In this aspect a larger CG storage tank comprising a plurality of tanks 510A serves a plurality of rail cars 500E and 500F. Although two cars are shown, more can be added. Tanks 510A are a stack of pipe sections that terminate in sealed manifolds 515A and 515B at each end of the stack. Tanks 510A are mounted on a flat rail car 600. CG is released from these tanks via pipe sections 124 when valves 126 and 128 (not shown in this drawing) are opened. When the CG is released, CG pressure is applied to tanks 500 via pipes 136, water is forced out of tanks 500 through pipes 138, through heat exchangers 116, and out through pipes 140 to nuclear plant 100 (not shown in this figure).

To provide enough CG to pressurize at least six water storage tanks 500, 40 to 60 pipe sections 510A with dimensions described above should be provided. In the present arrangement, many railroad tanks 500 can be brought near flatcar 600 with tanks 510A and connected to lines 136, 138, and 140. When a water tank car is empty, it can be quickly disconnected from the CG source on flatcar 600 and replaced by another, thereby providing a continuing source of water to plant 100.

Third Version—FIG. 7

FIG. 7 shows a third version, specifically a cross-sectional end view of a housing 700 that protects and conceals an RRTC. A safe parking and connection area for the RRTC and flat cars placed around a nuclear plant can be as simple as a shallow trench that has concrete walls on either side to protect the railroad cars from the high winds of a tornado and terrorist attacks with vehicles. Empty cars can be rolled away during a nuclear emergency and either refilled or replaced by previously filled cars.

Tank cars 500 and flat cars 600 with CG storage tanks 510 are parked in a trench 705 dug into the ground to partially protect the RRTC system. A strong concrete fence 710 runs along both sides of trench 705. A roof structure 715 sits on fence 710 and spans across trench 705 above the rail cars. A plurality of railroad tracks 720 is laid on the ground at the bottom of trench 705.

This embodiment of the RRTC system provides substantial protection from tornadoes and vehicular attacks by terrorists. The below ground level placement of tracks 720 also allows easy movement of replacement tank cars 500 and CG storage cars 600.

This RRTC system is not expensive to construct. It requires mainly dirt excavation and placement of prefabricated fence sections 710 along the edges of trench 705. Fence sections 710 can be standard K-rail concrete sections used as traffic barriers on roadways, for example.

Full CGES System for Large Nuclear Plant

A full CGES Emergency Core Cooling System using the CGES embodiments shown in FIGS. 2-4 and FIGS. 5-7 will normally comprise many interconnected water tanks 106 and CG tanks 112 as shown in FIG. 4. For instance, the total decay heat from a 1300 MWe (3900 MWt) reactor for the first three days after SCRAM requires at least 22 tanks 106 each holding 100 m³ of cooling water plus as many companion tanks 112 holding 10 m³ of CG at 200 bars (or equivalent CG volume stored by other means). A smaller nuclear plant, say, 1000 MWe, would require only 17 tanks 106 of 100 m³ capacity each.

CG tanks 112 in FIGS. 1 and 2 can be realized in many forms other than those shown in the embodiments described. Tanks 112 can be separate bore holes lined with steel nearby the tanks 106 that they pressurize. Above-ground tanks 112 can be segments of high pressure pipe, such as used for high-pressure natural-gas pipelines. One of the least expensive ways to store and deliver large quantities of CG is to use many segments of small diameter, thick-walled pipe stacked together and connected as shown for item 510A on flatcar 600 in FIG. 6. CG tanks can be realized with large capacity plastic bags or bladders that are filled with CG and held deep underwater to balance the internal pressure of the CG. An advantage of this approach is that the CG is delivered at a constant pressure equal to the water pressure on the bags.

Inherent Safety of Compressed Gas Supply Systems.

The CG energy sources for all embodiments of the CGES system can be replenished by external or emergency air compressors and compressed air sources such as the liquid nitrogen tanks 415L and 415R shown in FIG. 4. Attaching additional sources of compressed gas to an existing CG delivery system is both far easier and safer than attaching backup electrical generators to an existing power grid. Backup generators attached to a nuclear plant must be matched carefully in voltage and phase with the internal electrical system. However, using check-valve connectors, additional sources of compressed air, such as tanks 112 in the above embodiments, can be attached easily to an existing CG supply system with reduced concerns for safety or compatibility. CG will flow from the new system to the existing supply system only when the new system pressure is greater than the pressure in the existing system. The importance of this feature of the CGES system was demonstrated by the frustration of operators during the Fukushima accident in 2011 when they tried to connect outside backup electrical generators to the nuclear plant electrical switching equipment that had been disabled by the tsunami.

Figure 8:
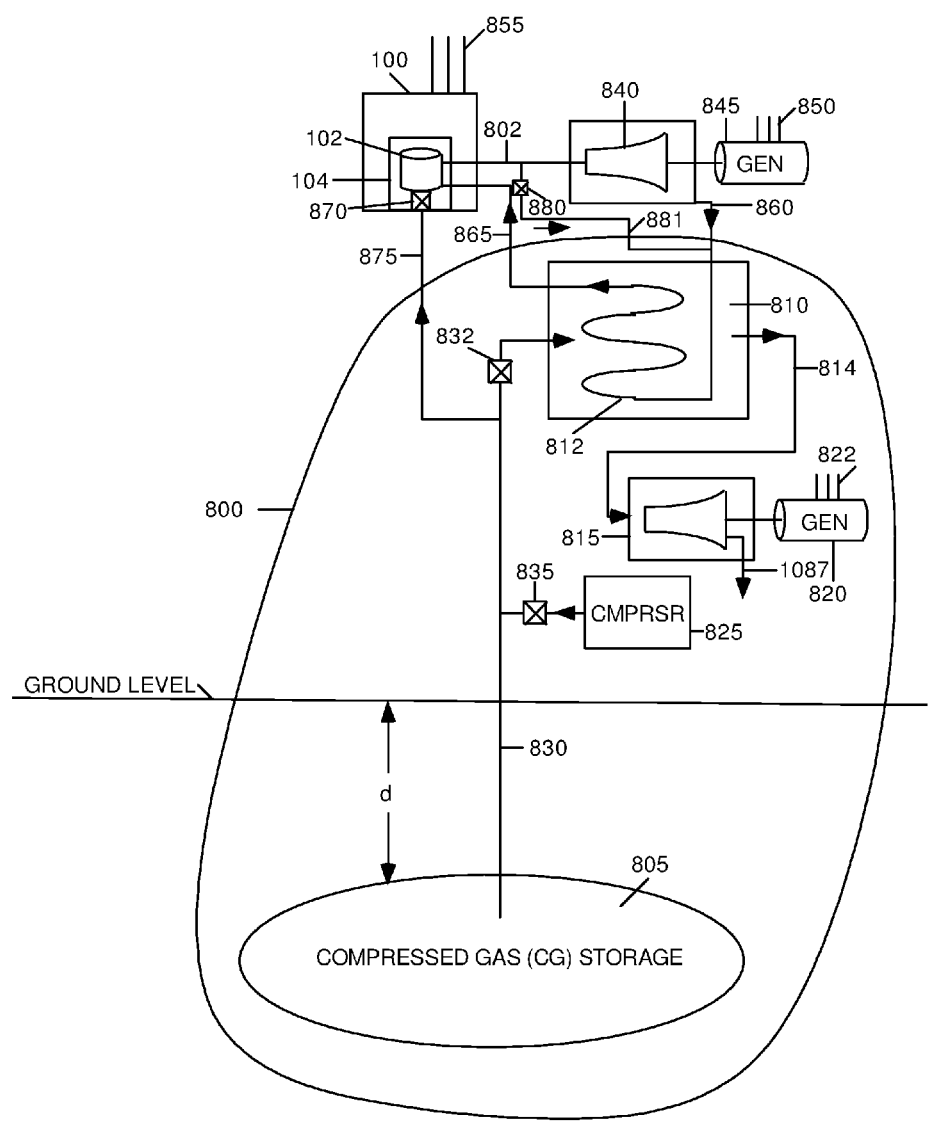
FIG. 8 is a schematic diagram showing an NCAP system.

Third Alternative Embodiment—Description and Operation—FIG. 8

FIG. 8 is a schematic diagram showing a combination of a nuclear power plant 100 with a Compressed Air Energy Storage (CAeS) power plant 800. In this embodiment as shown in FIG. 8, a nuclear plant 100 and a CAeS plant Boo are connected in a unique way that provides a passive safety system for the nuclear plant 100 and great cost savings and pollution reduction for the CAeS plant. System Boo stores a very large amount of compressed air (CG) in an underground storage cavern 805 which is normally used to generate power during peak power demands on an electrical grid to which it is connected. Cavern 805 is recharged with CG during off-peak times. The large amount of CG in cavern 805 is also used to cool the reactor in its companion nuclear plant 100 during a nuclear emergency. This embodiment is called NCAP for Nuclear Compressed Air Power plant.

In one aspect of the NCAP embodiment, the CAeS system comprises a heat exchanger 810 having an interior volume containing a coil 812, a turbine 815, an auxiliary generator 820, a compressor 825, cavern 805, and a plurality of pipes and valves. A pipe 830 conveys CG to and from cavern 805.

Storing CG in CAeS Plant.

Compressor 825 is connected to pipe 83o by a valve 835. When it is desired to add CG to cavern 805, valve 835 is open, compressor 825 is activated, and all other valves are closed. Compressor 825 can be powered by the electrical output of plant 100, or another means such as an internal combustion engine. When the CG pressure in cavern 805 reaches a predetermined level, compressor 825 is deactivated and valve 835 is closed.

Cooling Plant 100 in an Emergency—FIG. 8.

In the event of a SCRAM, RPV 102 can be cooled very rapidly by the CG stored in the companion CAeS plant Boo shown in FIG. 8. A flow control valve 870 and pipe 875 are connected to CG transfer pipe 830 for this purpose. In this event, flow control valve 870 is opened manually or automatically to send CG directly from storage in cavern 805 to expand around the fuel rods in the nuclear reactor 102 in plant 100. Flow control valve 870 is mounted on or near the reactor pressure vessel 102 so that it can extract heat from the reactor vessel as required for proper operation.

CAeS Plant to Supply Emergency Power for Companion Nuclear Plant.

In normal operation, nuclear power plant 100 generates steam that is sent via a pipe 802 to a turbine 840 that in turn drives an electrical generator 845. Generator 845 delivers electrical power to a power grid via a plurality of conductors 850. Plant 100 receives electrical power from the power grid and-or backup electrical generators via a plurality of conductors 855.

During an emergency when backup electrical power is disabled but the emergency reactor cooling systems (ECCS) in plant 100 are otherwise capable of operating, the electrical output of CAeS plant Boo can very quickly supply emergency power to plant 100.

Generator 820 has a plurality of output conductors 822. When required, lines 855 that feed plant 100 are disconnected from an external power source and connected to lines 822 of generator 820.

To power turbine 815 and generator 82o, a valve 832 in pipe 830 is opened so that CG enters heat exchanger 810, passes over a set of coils 812 in heat exchanger 810, and exits via a pipe 814 on its way to turbine 815.

A typical nuclear plant 100 that is disconnected from the electrical grid cannot supply power thereafter to its own emergency systems. The power output of the nuclear reactor cannot be scaled down quickly to the much smaller demand of its own emergency systems alone. However, a CAeS power plant Boo is a rapid response peak power plant that can scale its output power to the power requirements at any time. Hence, the CAeS power plant 800 can supply the backup electrical power needed to operate the ECCS systems in nuclear plant 100 when it is disconnected from the grid.

Eliminating Fossil Fuel Energy Normally Required by a CAeS Plant.

In the normal operation of existing CAeS power plants 800, large amounts of natural gas or other fuel are used to supply the heat required for the CG in storage 805 to expand in turbine 815. However, when a CAeS is combined with a nuclear plant 100 in the NCAP embodiment, abundant waste heat is available from plant 100 to heat the CG so it can expand in turbine 815. Steam and water leaving turbine 840 in nuclear plant 100 must be cooled and condensed before the water is returned to the reactor pressure vessel. The "waste heat" that must be dissipated is approximately 60% of the thermal power generated by the reactor in plant 100.

Only a small part of the waste heat from plant 100 is sufficient to heat the CG from cavern 805 so that it can expand in turbine 815.

In the NCAP embodiment, some of the steam and water leaving turbine 840 in nuclear plant 100 are passed through coils 812 of heat exchanger 810, and then returned to plant 100 via a pipe 865. CG passing through heat exchanger 810 collects the heat it needs to expand in turbine 815. If more heat is needed for the CG entering turbine 815, a valve 880, connected to line 802, is opened, sending high temperature steam from RPV 102 (FIG. 1) directly through pipe 881 and coils 812 of heat exchanger 810.

Figure 9:
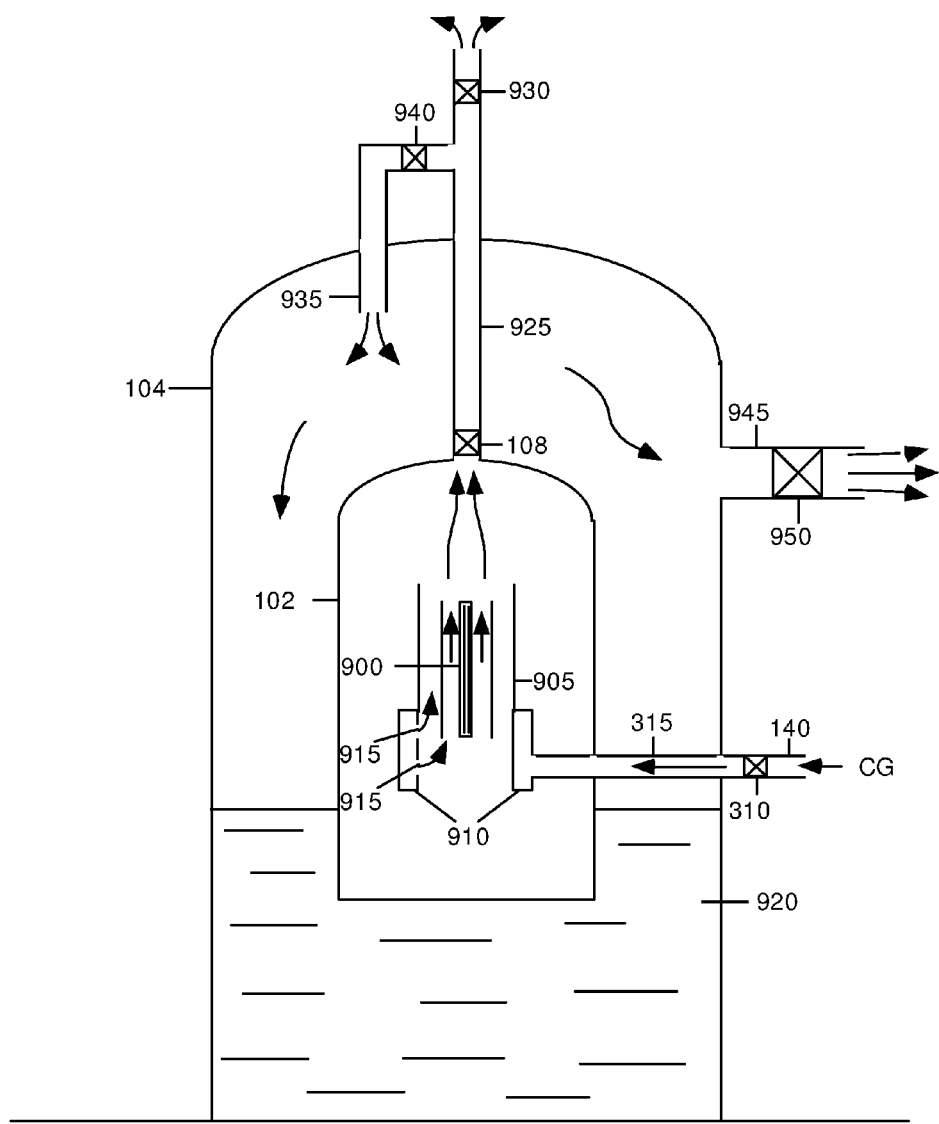
FIGS. 9 to 11 show CG paths inside a nuclear reactor after a SCRAM.

Gas Path Inside a Reactor—FIG. 9.

FIG. 9 is a schematic diagram that shows one embodiment of the NCAP design that injects CG from storage cavern 805 (FIG. 8) in the above CAeS system into a nuclear reactor in plant 100. A plurality of fuel rods 900 is positioned within a baffle 905. Baffle 905 is a tall, cylindrical structure that surrounds rods 900. Such baffles are commonly used to shield the inner wall of RPV 102 from neutron radiation coming from the fuel rods and for channeling the primary heat transfer water around rods 900 during normal operation. A closed, cylindrical manifold 910 is tightly mounted outside and around a lower portion of baffle 905. Pipes 140 and 315 deliver CG to manifold 910 when valve 310 is opened during a nuclear emergency. During the emergency fuel rods 900 must be cooled by external means. CG leaves manifold 910 via a plurality of openings 915 and expands in the volume surrounding rods 900. Manifold 910 is described in greater detail below. PCV 104 can contain a pool of suppression water 920 surrounding RPV 102 up to a predetermined level.

During an emergency when fuel rods 900 must be cooled by external means, valve 310 is opened. A large volume of CG from storage 805 is directed through line 315 into baffle 910 inside RPV 102. The CG expands as it flows out of manifold 910 and over rods 900, thereby extracting heat from the environment around the fuel rods. The expanded CG exits via pipe 925 either into the atmosphere outside PCV 104 or into PCV 104, or both. Gases that enter PCV 104 are vented to the atmosphere via pipe 945 when valve 950 is opened.

Valve 108 is the safety relief valve on RPV 102 that opens when the pressure in RPV 102 exceeds the maximum allowable level. Relief valve 108 can be opened to vent water and steam out of RPV 102 if necessary. When the ECCS systems in a SCRAMMED plant 100 are disabled, valve 108 normally will be opened to vent fluids in RPV 102 and allow injection of cooling fluids into RPV 102. However, this was not done during the Fukushima accident until it was too late A pipe 925 conducts fluids from RPV 102. Valve 930 releases fluids into the atmosphere when it is opened. Another pipe 935 branches from pipe 925. A valve 940 in pipe 935 vents fluids into PCV 104 when it is opened. When desired, valves 925 and 940 can be opened at the same time, venting fluids into PCV 104 and the atmosphere outside RPV 102. An additional pipe 945 and valve 950 are provided to vent fluids from PCV 104 when valve 950 is opened.

Figure 10:
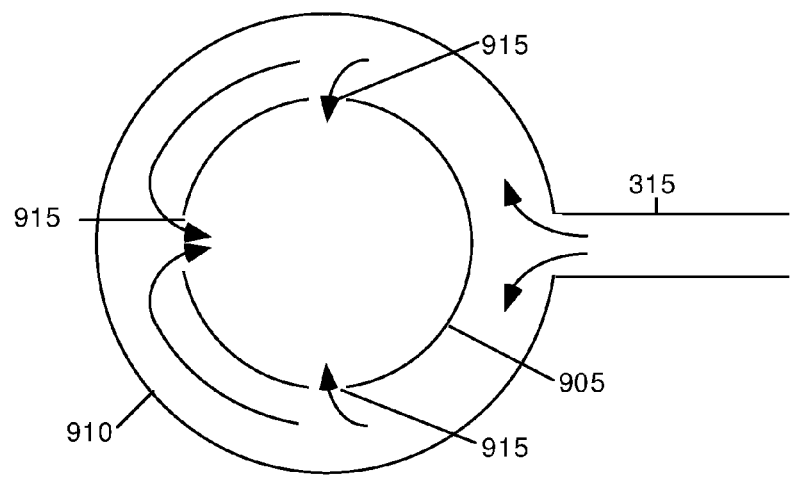
Figure 11:
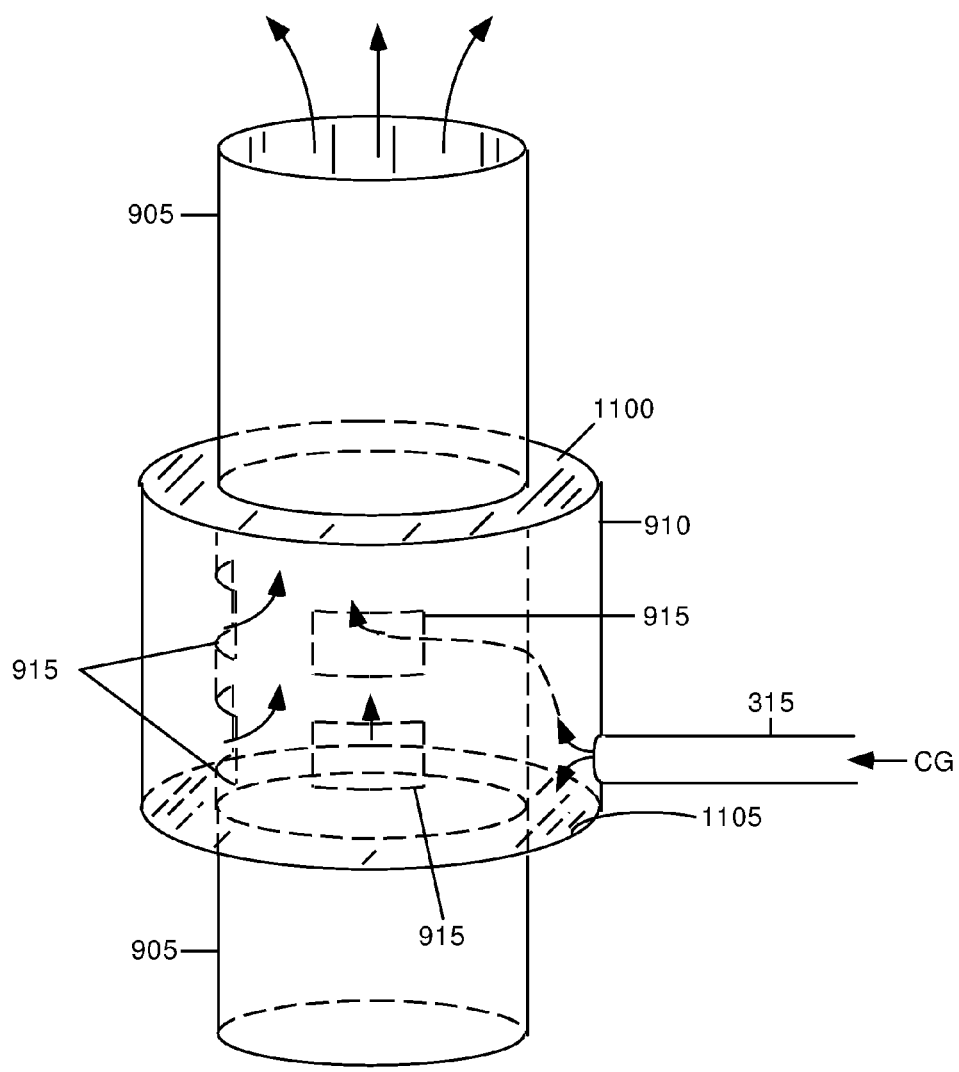

Detailed Description of Baffle 905 and Manifold 910—FIGS. 10 and 11.

FIG. 10 is a top view of manifold 910 and baffle 905. CG enters manifold 910 via pipe 315 and flows inward toward rods 900 (not shown in this view) via a plurality of openings 915.

FIG. 11 is a perspective view of baffle 905 and manifold 910. Manifold 910 includes a pair of annular plates 1100 and 1105 that seal manifold 910 to baffle 905 in such a way that unexpanded CG is directed to exit out of manifold 910 through a plurality of openings 915 which direct the CG inside of baffle 905.

As above, pipe 315 delivers CG to manifold 910 and manifold 910 directs the CG to the volume around the fuel rods 900 (not shown in this view).

The feasibility of the NCAP embodiment is demonstrated by the fact that the stored CG in a moderate size CAeS plant can cool a 3900 MW thermal reactor for at least three days with no regeneration of the CG in its storage 805. One existing 110 MW CAeS peak power plant (not connected to a nuclear plant) stores up to 19 million cubic feet of compressed air at 70 bars (1029 psi) in an underground salt cavern (3). This CAeS plant releases its stored CG to generate 110 MW of electricity on demand for several hours per day when needed. The total heat absorbing capacity of the 19 million cubic feet of CG at 70 bars is 16 million MegaJoules (MJ), assuming this amount of CG expands isothermally back to 1 bar at ambient temperature. (19 million cubic feet=0.538 million cubic meters. Multiplying 0.538 million $m^3 \times 30$ MJ per $m^3$ for air at 1 bar compressed to 70 bars=16 million MJ for the heat of compression which heat is extracted from the environment when the gas expands isothermally.) Assuming that only one half of this heat absorbing capacity can be realized by expansion in a reactor, 8 million MJ of reactor decay heat still can be removed by the stored CG in a typical CAeS plant.

The total decay heat from a 3900 MW nuclear reactor is about 3 million MJ for the first three days after SCRAM. Even with the incomplete expansion of the CG in a reactor, eight million MJ of heat absorbing capacity is enough to cool a 3900 MW reactor for three days with no cooling water available. In addition, the CAeS can begin delivering enormous quantities of CG very quickly, within minutes, to handle the immediate maximum decay heat (7% of rated thermal power) that must be removed to avoid damage to the fuel rods in a companion nuclear plant as shown in the NCAP embodiment of FIG. 8.

It can be expected that either grid power or standby electrical generators will be available within three days to power air compressor 825 in FIG. 8 to regenerate the CG in cavern 805 so that reactor cooling can continue indefinitely. Note that only the large CG cavern 805 is necessary to provide a security blanket of emergency cooling for plant 100. Plant 800 does not have to produce electrical power from the CG in cavern 1080.

The unique nature of the NCAP embodiment is demonstrated by the fact that the nuclear power industry heretofore has not utilized the tremendously valuable safety enhancement plus the great cost savings available by connecting a relatively inexpensive CAeS system to a nuclear plant as shown in FIG. 8.

The Fukushima nuclear meltdowns in 2011 would not have happened if the reactors had been connected to even one inexpensive CAeS power plant as described for the NCAP embodiment. Tens of billions of dollars of loss could have been prevented with the addition of the 100 million dollar CAeS plant shown in FIG. 8.

The NCAP combination provides cost savings that pay for the CAeS peak power plant connected to a nuclear plant. A nuclear plant is the ideal off-peak power source to re-charge the compressed gas storage in a CAeS plant. All the components required for this NCAP embodiment are operating at separate locations today. Clearly, the two plants should be built at a common location wherever possible. All that is required to achieve the NCAP design is the water-to-gas heat exchanger 810 and a pipeline connection 875 between the CAeS plant and nuclear plant 100 as shown in FIG. 8.

The "safety blanket" provided by the NCAP embodiment of FIG. 8 is extremely valuable. This degree of safety has not been available for land-based nuclear reactors by any other means. The cost of a CAeS compressed air underground storage system is less than 3% of the cost of a typical nuclear power plant. The availability of a (100 million dollar or less) CAeS during a nuclear emergency can avoid the loss of a 10-billion-dollar nuclear plant and the tens of billions of additional cost for environmental damage and clean up, not to mention the loss of lives and injuries and public confidence in nuclear power. And, a CAeS plant connected to a nuclear plant as shown in the NCAP design of FIG. 8 pays for itself many times over.

Cooling Fuel Rods in a Ruptured RPV.

The combined nuclear plant and compressed air energy storage (NCAP) embodiment is the only ECCS that can cool a reactor after the RPV has been damaged to the point that it cannot hold any cooling water around the fuel rods therein. In fact, the NCAP works best under this severe condition. A ruptured RPV allows full expansion of the CG injected around the fuel rods (and maximum decay heat extraction) without any pressure build up in the RPV. All ECCS systems that rely on cooling water, including the AP1000, cannot rescue a nuclear power plant with a severely ruptured RPV.

Serious corrosion has been discovered in the thick steel lid of at least one older U.S. nuclear reactor RPV. That lid was very close to rupturing. Had that occurred under operating pressure, all internal ECCS systems (and operators) in that nuclear plant would have been disabled. Even a plant using the AP1000 design would have been helpless to avoid a meltdown. With hundreds of aging reactors around the world, it can be expected that more such events will happen in time.

Compressed Air energy Storage (CAeS) systems are now being planned that will use long segments of high pressure pipe on the ground to replace underground caverns for storing large quantities of CG. This CG storage can be installed easily in the open areas around most nuclear power stations. This embodiment (not shown) of CG storage 805 in FIG. 8 provides the NCAP emergency cooling for a reactor even if the CG stored is not used for peak power production as in a full CAeS peak power plant.

CONCLUSIONS, RAMIFICATIONS, AND SCOPE

It is imperative that the aging nuclear power stations of the world be provided enhanced safety systems as soon as possible.

All embodiments of the present emergency core cooling systems (ECCS) can carry out the reactor cooling operation under worst case conditions that cannot be handled by any of the existing ECCS systems approved or in nuclear plants today. These systems can cool a water-cooled reactor in the most extreme case, i.e., where all primary coolant has been lost and the internal plumbing connected to the reactor has been damaged such that even new cooling water cannot be circulated through the reactor's "primary boundary" by the in-plant equipment. Also, the reactor pressure vessel (RPV) can be cracked such that it cannot hold high-pressure water or steam. All embodiments of the present system inject external cooling fluid directly into an RPV under relatively low-pressure conditions. The cooling fluid injected does not have to be retained long-term in the RPV under high pressure. The injected coolant absorbs decay heat as it passes through the RPV. Then it is vented directly out of the reactor to the primary containment vessel (PCV), and-or empty external water tanks, and-or the environment.

All embodiments can bring a nuclear reactor to cold shutdown condition and cool it indefinitely thereafter with recharging of cooling fluids.

The systems can be installed immediately from robust, reliable components that are available worldwide without the development and certification of new technology.

All embodiments are compatible with and can add to the capability of existing ECCS systems if the existing systems are capable of operating to some degree after a nuclear power station has been shut down.

None of the embodiments described require extensive regulatory agency approval or delay. They can be installed outside a nuclear power station with physical connection only to the existing external cooling water input port(s) and output fluid venting port(s) on all nuclear reactor pressure vessels (RPV). They are the equivalent of parking fire trucks loaded with water outside a nuclear plant. Installation can be done without significant interruption of nuclear power station operation. No new or unproven technology is required to construct any of these embodiments.

A full CGES Emergency Core Cooling System using the CGES embodiments shown in FIGS. 2-4 and FIGS. 5-7 will normally comprise many interconnected water tanks 106 and CG tanks 112 as shown in FIG. 4. For instance, the total decay heat from a 1300 MWe (3900 MWt) reactor for the first three days after SCRAM requires at least 22 tanks 106 each holding 100 $m^3$ of cooling water plus as many companion tanks 112 holding 10 $m^3$ of CG at 200 bars (or equivalent CG volume stored by other means). A smaller nuclear plant, say, 1000 MWe, would require only 17 tanks 106 of 100 $m^3$ capacity each.

All embodiments of the CGES can be tested at any time without interruption of power generation at a nuclear plant. A large number of nuclear plants have been shut down since the Fukushima accident in 2011. Owners are now planning to start up some of these plants. Installation of one or more of the embodiments of the present system can be tested thoroughly on any idle plant before it is reactivated by injecting cooling fluid into the RPV. This would demonstrate enhanced safety to the press and public in a manner that they can understand.

While the above description contains many specificities, these should not be construed as limitations on the scope, but as exemplifications of some present embodiments. Many other ramifications and variations are possible within the teachings. Thus the scope should be determined by the appended claims and their legal equivalents, and not by the examples given.

The invention claimed is:

1. A method for removing decay heat from a nuclear reactor after shutdown, where said reactor has nuclear fuel rods and a cooling water input connected to deliver water that is supplied to said cooling water input to said fuel rods, comprising:

providing a tank of water having an inlet and an outlet,
providing a source of compressed gas,
said source of compressed gas being connected to said inlet of said tank of water, said outlet of said tank of water being connected to said cooling water input and to said fuel rods of said reactor,
allowing said compressed gas to flow into said inlet of said tank of water so that said compressed gas enters said tank and forces said water to leave said outlet of tank and flow to said cooling water input of said nuclear reactor and then to said fuel rods of said nuclear reactor, said compressed gas being the only force that urges said water to said cooling water input and said fuel rods of said nuclear reactor, whereby said compressed gas will force said water to flow into said nuclear reactor and cool said fuel rods to remove said decay heat from said reactor.

2. The method of claim 1 wherein
(a) said source of compressed gas is compressed to at least 1000 pounds per square inch, and further including
(b) providing a pressure reducing expansion valve to reduce the pressure of said gas to a relatively lower level of compression before it is allowed to flow into said inlet of said tank of water, and
(c) conveying the water that said compressed gas forces from said tank of water to provide heat of expansion to said expansion valve to prevent freezing of the environment around said expansion valve before said water flows to said cooling water input of said nuclear reactor.

3. A passive safety method for cooling the fuel rods in a reactor pressure vessel in a nuclear power plant after a shutdown, where said reactor pressure vessel has a cooling water input, comprising:
(a) providing a source of compressed gas at a relatively high pressure of at least 1000 pounds per square inch,
(b) providing a reservoir of water,
(c) conveying a stream of said highly compressed gas from said source to a location separate from said source,
(d) expanding said stream of said highly compressed gas at said separate location to a relatively low pressure gas stream, resulting in lowering the temperature of said gas stream due to the expansion of said gas,
(e) using said relatively low-pressure gas stream to force said water out of said reservoir in a stream to said separate location, such that said stream of water makes thermal contact with said relatively low pressure gas stream and supplies heat to said relatively low-pressure gas stream to prevent said relatively low-pressure gas stream from freezing the environment at said separate location,
(f) conveying said stream of water from said separate location, after it supplies heat to said relatively low-pressure gas stream, to said cooling water input of said reactor pressure vessel of said nuclear power plant so as to cool said fuel rods in said reactor pressure vessel, whereby said low-pressure gas stream will force said stream of water of water to said separate location where it will first raise the temperature of said low-pressure gas stream to prevent freezing and thereafter to said reactor pressure vessel where it will second absorb heat from said fuel rods in said reactor pressure vessel to mitigate overheating thereof.

4. The passive safety method for cooling a reactor pressure vessel of claim 3 wherein:
said location separate from said source contains an expansion valve having an input and an output and a heat exchanger having a water input, a water output, and a compressed gas output,
said stream of said highly compressed gas is conveyed to said input of said expansion valve,
said stream of water is conveyed to said water input of said heat exchanger so that, when water is forced out of said reservoir, it will flow to said water input of said heat exchanger,
said expansion valve placed inside or connected to said heat exchanger so that said water flowing through said heat exchanger will transfer heat to said pressure-reducing expansion valve and to said compressed gas entering and leaving said expansion valve so that said compressed gas will not freeze its environment as it leaves said expansion valve,
said output of said expansion valve being arranged to pass said expanded gas into said heat exchanger so that said compressed gas will flow through said heat exchanger to said compressed gas output of said heat exchanger,
said compressed gas output of said heat exchanger is connected to said reservoir of water so that it will force said water out of said reservoir and to said water input of said heat exchanger,
said water output of said heat exchanger being connected to said cooling water input of said reactor pressure vessel.

5. The passive safety method of claim 3 wherein a plurality of reservoirs of water is provided and said relatively low-pressure gas stream is arranged to force said water out of said plurality of reservoirs to said separate location.

6. The passive safety method of claim 3 wherein a plurality of said sources of compressed gas at said relatively high pressure is provided, and a plurality of streams of said highly compressed gas is conveyed from said plurality of reservoirs to said separate location.

7. The passive safety system of claim 3 wherein said source of compressed gas is contained within said reservoir of water and is surrounded by the water in said reservoir of water.

8. The passive safety method of claim 3 wherein said reservoir of cooling water and said source of compressed gas are portable.

9. The passive safety method of claim 8 wherein said reservoir of water and said source of compressed gas are mounted on at least one movable wheeled conveyance.

10. The passive safety method of claim 3 wherein at least one of said reservoir of water and said source of compressed gas is located at a place selected from the group consisting of above ground and underground.

11. The passive safety method of claim 3 wherein said source of compressed gas is a compressed-gas tank which stores said compressed gas at a pressure of at least 1000 pounds per square inch.

12. The passive safety method of claim 3, further including providing a compressed-gas valve arranged to deliver said stream of said highly compressed gas from said compressed gas tank when said valve is opened and to prevent delivery of compressed gas from said compressed gas tank when said valve is closed.

13. The passive safety method of claim 3 wherein a plurality of reservoirs of water are provided, and said relatively low-pressure gas stream is arranged to force said water out of said plurality of reservoirs to said separate location.

14. The passive safety method of claim 5 wherein a plurality of said sources of compressed gas at a relatively high pressure is provided, and a plurality of streams of said highly compressed gas is conveyed from said plurality of water reservoirs to said separate location.

15. A method for removing decay heat from a nuclear reactor after shutdown, said nuclear reactor having a cooling fluid inlet, said method comprising:
providing a tank of water having an inlet and an outlet,
providing a source of relatively highly compressed gas compressed to at least 1000 pounds per square inch, providing a pressure-reducing gas expansion valve having an inlet and an outlet and a heat exchanger having an inlet and an outlet, said source of highly compressed gas being connected to said inlet of said expansion valve, so that said highly compressed gas will expand to a relatively low pressure and drop in temperature, said outlet of said tank of water being connected to said inlet of said heat exchanger, said outlet of said expansion valve being connected to said inlet of said tank of water, said outlet of said heat exchanger being connected to said cooling fluid inlet of said reactor, and releasing said highly compressed gas to said expansion valve so that said gas will expand to a relatively low pressure and flow to said tank of water and force said water to flow through said heat exchanger, said heat exchanger being in thermal contact with said expansion valve, so that said water in said heat exchanger will transfer heat to said gas to prevent said gas from freezing its environment, and then flow to said cooling fluid inlet of said reactor to absorb heat from said reactor to prevent overheating thereof.

16. The method of claim 15 wherein said tank of water and said source of compressed gas are buried underground.

17. The method of claim 15 wherein said tank of water and said source of compressed gas are portable.

18. The method of claim 15 wherein said tank of water and said source of compressed gas are mounted on at least one movable wheeled conveyance.

19. The method of claim 18 wherein said wheeled conveyance, said tank of water, and said source of compressed gas are concealed in a trench.

20. The method of claim 18 wherein a plurality of tanks of water and a plurality of sources of highly compressed gas compressed to at least 1000 pounds per square inch are provided and said plurality of tanks of compressed gas are connected to said plurality of tanks of water.

* * * * *